US012755853B2

(12) United States Patent
Jackson et al.

(10) Patent No.: US 12,755,853 B2
(45) Date of Patent: Oct. 6, 2026

(54) SULFUR BLANKET

(71) Applicant: Beam Alpha, Inc., West Chicago, IL (US)

(72) Inventors: Gerald Peter Jackson, Lisle, IL (US); Joseph Matthew Zlotnicki, Downers Grove, IL (US)

(73) Assignee: Beam Alpha, Inc., West Chicago, IL (US)

( * ) Notice: Subject to any disclaimer, the term of this patent is extended or adjusted under 35 U.S.C. 154(b) by 685 days.

(21) Appl. No.: 17/924,170

(22) PCT Filed: Jun. 7, 2021

(86) PCT No.: PCT/US2021/036092
§ 371 (c)(1),
(2) Date: Nov. 9, 2022

(87) PCT Pub. No.: WO2022/031361
PCT Pub. Date: Feb. 10, 2022

(65) Prior Publication Data

US 2023/0187090 A1 Jun. 15, 2023

Related U.S. Application Data

(60) Provisional application No. 63/036,029, filed on Jun. 8, 2020.

(51) Int. Cl.
*G21C 5/00* (2006.01)
*G21B 1/13* (2006.01)
*G21C 1/32* (2006.01)

(52) U.S. Cl.
CPC ................ *G21B 1/13* (2013.01); *G21C 5/00* (2013.01); *G21C 1/32* (2013.01)

(58) Field of Classification Search
CPC ............... G21B 1/13; G21C 5/00; G21C 1/32
See application file for complete search history.

(56) References Cited

U.S. PATENT DOCUMENTS 2,796,396 A * 6/1957 Szilard .................. G21C 15/04
976/DIG. 189
2,832,733 A * 4/1958 Szilard .................. G21C 15/20
376/214

(Continued)

FOREIGN PATENT DOCUMENTS

AU 476735 B2 10/1974
CA 987035 4/1976

(Continued)

OTHER PUBLICATIONS

Dylla. How Long is the Fuse on Fusion? Springer Nature Switzerland AG 2020, pp. 85-86. (Year: 2020).*

(Continued)

*Primary Examiner* — Lily C Garner
(74) *Attorney, Agent, or Firm* — Peter K Trzyna, Esq.

(57) ABSTRACT

A machine, article, process of using, process of making, products produced thereby and necessary intermediates. Illustratively, there can be a process of producing electrical power, the process comprising: creating neutrons via nuclear reactions, said neutrons carrying neutron kinetic energy; moderating said neutrons to thermal energies to produce moderated neutrons, converting the neutron kinetic energy into heat, and transmitting said heat to a heat exchanger, creating ions via the nuclear reactions, stopping the ions to produce heat, and transmitting to said heat exchanger the heat generated by the stopping of the ions; capturing said moderated neutrons with sulfur atoms to produce heat, and transmitting to said heat exchanger energy released by the capturing of said moderated neutrons; transmitting energy from decaying radioisotopes created by the capturing of said (Continued)

moderated neutrons to said heat exchanger; heat exchanging at least some of each said heat and energy in said heat exchanger by converting water into steam; and generating electrical power with said steam.

10 Claims, 17 Drawing Sheets

(56) References Cited

U.S. PATENT DOCUMENTS

| | | | | | |
|---|---|---|---|---|---|
| 2,883,331 | A * | 4/1959 | Fontana | G21C 5/123 252/73 |
| 2,902,425 | A * | 9/1959 | Kosmin | G21D 5/08 376/310 |
| 2,905,610 | A | 9/1959 | Wigner | |
| 3,063,923 | A * | 11/1962 | Mayer | G21C 3/54 376/360 |
| 3,063,927 | A * | 11/1962 | Ort | G21C 5/123 376/310 |
| 3,120,475 | A | 2/1964 | Bennett | |
| 3,152,961 | A * | 10/1964 | Ellard | G21C 5/123 252/79 |
| 3,183,165 | A * | 5/1965 | Gutzke | G21C 5/123 976/DIG. 106 |
| 3,258,402 | A | 6/1966 | Farnsworth | |
| 3,297,537 | A * | 1/1967 | Natland | G21D 9/00 210/114 |
| 3,310,473 | A * | 3/1967 | Winsche | G21C 7/27 376/209 |
| 3,386,883 | A | 6/1968 | Farnsworth | |
| 3,533,910 | A | 10/1970 | Hirsch | |
| 4,129,772 | A | 12/1978 | Navratil et al. | |
| 4,172,008 | A | 10/1979 | Fleet | |
| 4,357,209 | A * | 11/1982 | Rugh, II | G21D 9/00 376/373 |
| 4,639,348 | A | 1/1987 | Jarnagin | |
| 4,788,024 | A | 11/1988 | Maglich et al. | |
| 4,826,646 | A | 5/1989 | Bussard | |
| 4,853,173 | A | 8/1989 | Stenbacka | |
| 4,949,011 | A | 8/1990 | Mann | |
| 5,818,891 | A | 10/1998 | Rayburn et al. | |
| 6,617,775 | B1 | 9/2003 | Seward | |
| 8,138,692 | B2 | 3/2012 | Macdonald-Bradley | |
| 8,399,852 | B2 | 3/2013 | Klein et al. | |
| 9,543,052 | B2 | 1/2017 | Jackson | |
| 10,421,412 | B2 | 9/2019 | Mouser et al. | |
| 10,896,768 | B2 * | 1/2021 | Sengbusch | G21G 4/02 |
| 12,272,537 | B2 | 4/2025 | Jackson | |
| 2003/0173914 | A1 | 9/2003 | Yamashita | |
| 2004/0213368 | A1 | 10/2004 | Rostoker | |
| 2005/0249324 | A1 | 11/2005 | Bevan | |
| 2007/0023648 | A1 | 2/2007 | Baba | |
| 2007/0045533 | A1 | 3/2007 | Krutchinsky et al. | |
| 2007/0114380 | A1 | 5/2007 | Jackson | |
| 2007/0114381 | A1 | 5/2007 | Jackson | |
| 2008/0155985 | A1 | 7/2008 | Labrador | |
| 2008/0187086 | A1 | 8/2008 | Bussard et al. | |
| 2010/0072362 | A1 | 3/2010 | Giles et al. | |
| 2011/0007860 | A1 | 1/2011 | Sanders, Jr. et al. | |
| 2011/0286563 | A1 | 11/2011 | Moses et al. | |
| 2012/0201342 | A1 * | 8/2012 | Jeanne | G21C 3/322 376/443 |
| 2013/0127376 | A1 | 5/2013 | Heid | |
| 2013/0221216 | A1 | 8/2013 | Makarov et al. | |
| 2013/0294558 | A1 | 11/2013 | Schulte | |
| 2016/0005582 | A1 | 1/2016 | Verenchikov | |
| 2016/0189815 | A1 | 6/2016 | Czerwinski et al. | |
| 2016/0216400 | A1 | 7/2016 | Navarro-Sorroche et al. | |
| 2017/0011811 | A1 | 1/2017 | Slough et al. | |
| 2017/0025190 | A1 | 1/2017 | Gibson | |
| 2017/0125129 | A1 | 5/2017 | Hora et al. | |
| 2017/0221694 | A1 | 8/2017 | Papanastasiou et al. | |
| 2017/0294238 | A1 | 10/2017 | Zheng | |
| 2018/0010219 | A1 | 1/2018 | Song | |
| 2018/0102191 | A1 | 4/2018 | Goldberg | |
| 2019/0139650 | A1 | 5/2019 | Laberge et al. | |
| 2020/0176133 | A1 | 6/2020 | Ooyama | |
| 2020/0176135 | A1 | 6/2020 | Shihao | |
| 2021/0252325 | A1 | 8/2021 | Corrigan et al. | |
| 2022/0077371 | A1 * | 3/2022 | Howe | B64G 1/1064 |
| 2022/0189647 | A1 | 6/2022 | Jackson | |
| 2023/0101575 | A1 | 3/2023 | Jackson | |
| 2023/0352195 | A1 | 11/2023 | Jackson | |

FOREIGN PATENT DOCUMENTS

| | | | | | |
|---|---|---|---|---|---|
| CA | 0002310071 | A1 | 5/1999 | |
| CA | 3178871 | | 2/2026 | |
| CN | 102312175 | A * | 1/2012 | C22C 1/02 |
| CN | 215118333 | | 10/2021 | |
| FR | 2789090 | A1 * | 8/2000 | C22C 38/58 |
| FR | 3086789 | A1 * | 4/2020 | G21C 7/28 |
| JP | 2001-511937 | | 8/2001 | |
| JP | 2002-168982 | | 6/2002 | |
| JP | 2005-189224 | | 7/2005 | |
| JP | 2010-540962 | | 12/2010 | |
| JP | 2020-519892 | | 7/2020 | |
| KR | 20090017777 | A * | 2/2009 | G21C 1/00 |
| RU | 2128374 | | 3/1999 | |
| RU | 2128374 | C1 | 3/1999 | |
| RU | 2606642 | C1 | 1/2017 | |
| WO | WO-2014200605 | A2 * | 12/2014 | F03G 7/08 |
| WO | WO-2015021403 | A1 * | 2/2015 | G21B 1/13 |
| WO | 2019021959 | A1 | 1/2019 | |
| WO | 2020185376 | A1 | 9/2020 | |
| WO | 2022031361 | A2 | 2/2022 | |
| WO | 2022046953 | A2 | 3/2022 | |

OTHER PUBLICATIONS

Thomas, William. National Ignition Facility Achieves Long-Sought Fusion Goal. Dec. 16, 2022. AIP News article. <https://ww2.aip.org/fyi/2022/national-ignition-facility-achieves-long-sought-fusion-goal#>. (Year: 2022).*

Tollefson, Jeff, and Elizabeth Gibney. "Nuclear-fusion lab achieves 'ignition': What does it mean?." Nature 612.7941 (2022): 597-598. <nature.com/articles/d41586-022-04440-7>. (Year: 2022).*

HyperPhysics. Temperatures for Fusion, Department of Physics and Astronomy, Georgia State University webpage. (Year: 2016).*

"Office Action-Restriction Requirement" issued Aug. 28, 2023, in U.S. Appl. No. 17/148,489. Titled "Ion Transport" for Beam Alpha, Inc. USPTO. pp. 1-9.

"Office Action-Non-Final" issued Jan. 5, 2024, in U.S. Appl. No. 17/148,489. Titled "Ion Transport" for Beam Alpha, Inc. USPTO. pp. 1-26.

"Declaration of Gerald Peter Jackson", filed May 11, 2024. Gerald Peter Jackson. pp. 1-24.

"Amendment and Response to Restriction Requirement/Election" filed Oct. 18, 2023, in U.S. Appl. No. 17/148,489. Titled "Ion Transport" for Beam Alpha, Inc. USPTO. pp. 1-15.

"Amendment and Response After Final" filed Oct. 2, 2024, in U.S. Appl. No. 17/433,924. Titled "Direct Nuclear Power Conversion". Beam Alpha, Inc. USPTO. pp. 1-75.

"Office Action-Final Rejection" issued Sep. 5, 2024, in U.S. Appl. No. 17/433,924. Titled "Direct Nuclear Power Conversion". Beam Alpha, Inc. USPTO. pp. 1-54.

"Reply to Rule 63(1) EPC" filed Sep. 5, 2024, in European Patent Application No. 21862687.7. Titled "Mixed Nuclear Power Conversion" for Beam Alpha, Inc. European Patent Office. pp. 1-7.

"Amendment and Response to Extended European Search Report" filed Oct. 7, 2024, in European Patent Application No. 21854417.9. Titled "Sulfur Blanket" for Beam Alpha, Inc. European Patent Office. pp. 1-47.

"Amendment and Response to Examiner's Report" filed Sep. 19, 2024, in Canadian Patent Application No. 3,178,742. Titled "Sulfur Blanket" for Beam Alpha, Inc. Canadian Intellectual Property Office. pp. 1-60.

(56) References Cited

OTHER PUBLICATIONS

Najmabadi, F. et al., "fusion reactor." Encyclopedia Britannica. https://www.britannica.com/technology/fusion-reactor. 2024. (Year: 2024).
Conn, R. "fusion reactor." Encyclopedia Britannica. https://www.britannica.com/science/nuclear-fusion. 2024. (Year: 2024).
"Brief on Appeal on Behalf of Appellant" for U.S. Appl. No. 17/433,924, Titled: "Direct Nuclear Power Conversion". Beam Alpha, Inc., filed Feb. 4, 2025. pp. 1-145.
"Evidence Appendix" for U.S. Appl. No. 17/433,924, Titled: "Direct Nuclear Power Conversion". Beam Alpha, Inc., filed Feb. 4, 2025. pp. 1-131.
https://www.energy.gov/science/doe-explainsfusion-reactions "DOE Explains . . . Fusion Reactions".
https://www.energy.gov/articles/how-particle-accelerators-work "How Particle Accelerators Work".
https://www.energy.gov/doe-fusion-energy-strategy-2024-executive-summary "DOE Fusion Energy Strategy 2024, Executive Summary".
https://www.energy.gov/sites/default/files/2024-06/fusion-energy-strategy-2024.pdf.
https://en.wikipedia.org/wiki/Ivy_Mike "Ivy Mike".
https://en.wikipedia.org/wiki/Fusor "Fusor".
https://en.wikipedia.org/wiki/List_of_fusor_examples "List of Fusor Examples".
https://www.shinefusion.com/ "Shine".
https://www.madisonstartups.com/shine-phoenix-set-world-record/ "Shine, Phoenix Set World Record".
https://tracxn.com/d/companies/shine-technologies/_ZQoSc1dFIYDoHLZq1zb6SVMjrm6wyy9Nfx2Lqlewmxg/funding-and-investors "Shine Medical raising $30 million Series C round".
https://cds.cern.ch/record/454179/files/p37.pdf "Sputter Pumps".
https://en.wikipedia.org/wiki/List_of_nuclear_power_stations "List of nuclear power stations".
http://web.archive.org/web/20241110224913/https://www.iter.org/few-lines "What is ITER?".
"Office Action—Final Rejection" in U.S. Appl. No. 17/926,614. Titled: "Ion Source". Beam Alpha, Inc. dated Feb. 6, 2025. pp. 1-17. USPTO.
"International Search Report" for PCT Patent Application No. PCT/US20/19449 Titled: "Direct Nuclear Power Conversion". Beam Alpha, Inc. Sep. 21, 2020. pp. 1-2. PCT International Searching Authority.
"Written Opinion of the International Searching Authority" for PCT Patent Application No. PCT/US20/19449 Titled: "Direct Nuclear Power Conversion". Beam Alpha, Inc. Sep. 21, 2020. pp. 1-9. PCT International Searching Authority.
"International Preliminary Report on Patentability" for PCT Patent Application No. PCT/US20/19449 Titled: "Direct Nuclear Power Conversion". Beam Alpha, Inc. Nov. 29, 2020. pp. 1-39. PCT International Searching Authority.
Ruggiero, "Nuclear fusion of protons with boron", Brookhaven National Lab,, No. BNL-47989; CONF-9209103--1, https://www.osti.gov/servlets/purl/6911764, 1992.
"Amendment and Response" for PCT Patent Application No. PCT/US20/19449 Titled: "Direct Nuclear Power Conversion". Beam Alpha, Inc., filed Oct. 27, 2020. pp. 1-19.
"Communication pursuant to Rules 70(2) and 70a(2) EPC" for European Application No. 20770753.0. Titled: "Direct Nuclear Power Conversion". Beam Alpha, Inc. Feb. 28, 2023. European Patent Office. pp. 1-1. Europe.
"Theory of Secondary Electron Emission by High-Speed Ions" by E.J. Sternglass published in Physical Review, vol. 108, issue No. 1, pp. 1-12 on Oct. 1, 1957.
"Electron Emission from Molybdenum Under Ion Bombardment" by J. Ferron et. al. published in Journal of Physics D: Applied Physics, vol. 14, pp. 1707-1720 in 1981.
"Secondary Electron Yields from Clean Polycrystalline Metal Surfaces Bombarded by 5-20 keV Hydrogen or Noble Gas Ions" by P.C. Zalm and L.J. Beckers published in the Phillips Journal of Research, vol. 39, pp. 61-76 in 1984.
"Secondary Electron Emission Produced by Relativistic Primary Electrons" by A.A. Schultz and M.A. Pomerantz published in The Physical Review, vol. 130, issue No. 6, pp. 2135-2141 on Jun. 15, 1963.
https://en.wikipedia.org/wiki/Collider#History.
"Response and Amended Claims" for European Application No. 20770753.0. Titled: "Direct Nuclear Power Conversion". Beam Alpha, Inc. Apr. 29, 2022. pp. 1-7. Europe.
https://en.wikipedia.org/wiki/Antiproton_Accumulator.
"European Search Report" for European Application No. 20770753.0. Titled: "Direct Nuclear Power Conversion". Beam Alpha, Inc. Feb. 10, 2023. European Patent Office. pp. 1-9. Europe.
Jowett, J. M., Schaumann, M. and Versteegen, R., 'Heavy-Ion Operation of HL-LHC', The High Luminosity Large Hadron Collider, chapter 21, pp. 359-371, 2015.
"Invitation pursuant to Rule 63(1) EPC" for European Application No. 20770753.0. Titled: "Direct Nuclear Power Conversion". Beam Alpha, Inc. Oct. 12, 2022. European Patent Office. pp. 1-4. Europe.
"Amended Claims" for European Application No. 20770753.0. Titled: "Direct Nuclear Power Conversion". Beam Alpha, Inc. Dec. 22, 2022. pp. 1-7. Europe.
"Reply to Rule 63(1) EPC Communication" for European Application No. 20770753.0. Titled: "Direct Nuclear Power Conversion". Beam Alpha, Inc. Dec. 22, 2022. European Patent Office. pp. 1-5. Europe.
"Communication pursuant to Rules 161(2) and 162 EPC" for European Application No. 20770753.0. Titled: "Direct Nuclear Power Conversion". Beam Alpha, Inc. Dec. 20, 2021. European Patent Office. pp. 1-3. Europe.
"Amendment and Reply" for European Application No. 20770753.0. Titled: "Direct Nuclear Power Conversion". Beam Alpha, Inc. Sep. 11, 2023. European Patent Office. pp. 1-15. Europe.
Reddie & Grose. "EPO Correction Letter" for European Application No. 20770753.0. Titled: "Direct Nuclear Power Conversion". Beam Alpha, Inc. Jun. 11, 2024. European Patent Office. pp. 1-15. Pete Sadler. Europe.
"Examiner's Report" for Canadian Patent Application No. 3,131,901. Titled: "Direct Nuclear Power Conversion". Beam Alpha, Inc. Mar. 27, 2023. Canadian Intellectual Patent Office. pp. 1-5. Canada.
"Examiner's Report" for Canadian Patent Application No. 3,131,901. Titled: "Direct Nuclear Power Conversion". Beam Alpha, Inc. Feb. 15, 2024. Canadian Intellectual Patent Office. pp. 1-4. Canada.
Rider, "A General Critique of Inertial-Electrostatic Confinement Fusion Systems", Thesis, MIT Department of Nuclear Engineering, https://dspace.mit.edu/handle/1721.1/29869, 1991.
Anon, "Wikipedia Article, "Fusors", "losses"", https://en.wikipedia.org/wiki/Fusor#Losses, Feb. 15, 2024.
"Response to Examiner's Report" for Canadian Patent Application No. 3,131,901. Titled: "Direct Nuclear Power Conversion". Beam Alpha, Inc. Jul. 26, 2023. Canadian Intellectual Patent Office. pp. 1-79. Canada.
"Response to Examiner's Report" for Canadian Patent Application No. 3,131,901. Titled: "Direct Nuclear Power Conversion". Beam Alpha, Inc. Jun. 14, 2024. Canadian Intellectual Patent Office. pp. 1-32. Canada.
"Examination Report No. 1" for Australian Patent Application No. 2020233809. Titled: "Direct Nuclear Power Conversion". Beam Alpha, Inc. Oct. 5, 2022. IP Australia. pp. 1-3. Australia.
Steerenberg, R., 'LHC Report: The LHC is full'. Published May 15, 2018. Retrieved from https://home.cern/news/news/accelerators/lhc-report-lhc-full.
"Examination Report No. 2" for Australian Patent Application No. 2020233809. Titled: "Direct Nuclear Power Conversion". Beam Alpha, Inc. May 31, 2023. IP Australia. pp. 1-4. Australia.
"Response to Examiner's Report" for Australian Patent Application No. 2020233809. Titled: "Direct Nuclear Power Conversion". Beam Alpha, Inc. May 24, 2023. IP Australia. pp. 1-143. Australia.
"Response to Examiner's Report" for Australian Patent Application No. 2020233809. Titled: "Direct Nuclear Power Conversion". Beam Alpha, Inc. Aug. 2, 2023. IP Australia. pp. 1-145. Australia.

(56) References Cited

OTHER PUBLICATIONS

"Examination Report No. 3" for Australian Patent Application No. 2020233809. Titled: "Direct Nuclear Power Conversion". Beam Alpha, Inc. Aug. 10, 2023. IP Australia. pp. 1-4. Australia.
Amasa B. Bishop, Project Sherwood—The U.S. Program in Controlled Fusion, (Addison-Wesley Pub. Co. Inc., Reading MA, 1958). ISBN-13: 978-0201005752.
"Cost and Performance Characteristics of New Generating Technologies, Annual Energy Outlook 2019", U.S. Energy Information Administration (Jan. 2019) https://www.eia.gov/outlooks/aeo/assumptions/pdf/table_8.2.pdf.
R.S. Craxton, et. al., "Direct-Drive Inertial Confinement Fusion: A Review", Phys. Plasmas 22, 110501 (2015). DOI: 0.1063/1.4934714.
J.D. Lindl, "Development of the Indirect-Drive Approach to Inertial Confinement Fusion and the Target Physics Basis for Ignition and Gain," Phys. Plasmas 2, 3933 (1995). DOI: 10.1063/1.871025.
J. D. Lindl, Inertial Confinement Fusion: The Quest for Ignition and Energy Gain Using Indirect Drive, (Springer-Verlag, New York, 1998). ISBN-13: 978-1563966620.
J.D. Lindl, et. al., "The Physics Basis for Ignition Using Indirect-Drive Targets on the National Ignition Facility", Phys. Plasmas 11, 339 (2004). DOI: 10.1063/1.1578638.
R.L. Hirsch, "Inertial-Electrostatic Confinement of Ionized Fusion Gases", J. Appl. Phys. 38,4522 (1967). DOI: 10.1063/1.1709162.
G.H. Miley and S.K. Murali, Inertial Electrostatic Confinement (IEC) Fusion: Fundamentals and Applications, (Springer-Verlag, New York, 2014). ISBN-13: 978-1461493372.
"Preliminary Amendment" for U.S. Appl. No. 17/433,924, Titled: "Direct Nuclear Power Conversion". Beam Alpha, Inc., filed Aug. 25, 2021. pp. 1-24.
"Amendment and Response" for U.S. Appl. No. 17/433,924, Titled: "Direct Nuclear Power Conversion". Beam Alpha, Inc., filed Aug. 8, 2024. pp. 1-71.
"Office Action" for U.S. Appl. No. 17/433,924, Titled: "Direct Nuclear Power Conversion". Beam Alpha, Inc., mailed Nov. 1, 2023. pp. 1-51.
"Office Action" for U.S. Appl. No. 17/433,924, Titled: "Direct Nuclear Power Conversion". Beam Alpha, Inc., mailed Feb. 8, 2024. pp. 1-46.
"International Search Report" for PCT Patent Application No. PCT/US21/36092 Titled: "Sulfur Blanket". Beam Alpha, Inc. Mar. 4, 2022. pp. 1-2. PCT International Searching Authority.
"Written Opinion" for PCT Patent Application No. PCT/US21/36092 Titled: "Sulfur Blanket". Beam Alpha, Inc. Mar. 4, 2022. pp. 1-9. PCT International Searching Authority.
"International Preliminary Report on Patentability" for PCT Patent Application No. PCT/US21/36092 Titled: "Sulfur Blanket". Beam Alpha, Inc. Mar. 4, 2022. pp. 1-6. PCT International Searching Authority.
"Extended European Search Report" for European Application No. 21854417.9 . Titled: "Sulfur Blanket". Beam Alpha, Inc. Apr. 17, 2024. European Patent Office. pp. 1-7. Europe.
"Amended Claims" for European Application No. 21854417.9. Titled: "Sulfur Blanket". Beam Alpha, Inc. filed Jan. 9, 2023. European Patent Office. pp. 1-8. Europe.
"Examiner's Report" mailed Apr. 29, 2024, for Canadian Patent Application No. 3,178,871. Titled: "Ion Source". Beam Alpha, Inc. Canadian Intellectual Property Office. pp. 1-7. Canada.
"Response and Amended Description" filed Aug. 28, 2024 in Canadian Patent Application No. 3,178,871. Titled: "Ion Source" Beam Alpha, Inc. Cassan Maclean IP Agency Inc. pp. 1-37. Canada.
Gerardo, J. B. et al., "Electron-Beam Excitation of Gas Lasers", International Topical Conference on Electron Beam Research & Technology, Albuquerque, NM, USA, Nov. 3-5, 1975, pp. 169-192, https://ieeexplore.ieee.org/document/6397723, 1975.
"Examiner's Report" for Canadian Application No. 3,178,742. Titled: "Sulfur Blanket". Beam Alpha, Inc. May 21, 2024. Canadian Intellectual Property Office. pp. 1-5. Canada.
"Claims Amendment" for Australian Application. PCT Application No. PCT/US2021/036092. Titled: "Sulfur Blanket". Beam Alpha, Inc. filed Dec. 5, 2022 . pp. 1-17. IP Australia.
"Claims Amendment" for Singapore Application No. 11202260876V. Titled: "Sulfur Blanket". Beam Alpha, Inc. filed Dec. 5, 2022 . pp. 1-19. Intellectual Property Office of Singapore.
"International Search Report" for PCT Patent Application No. PCT/US21/36115 Titled: "Ion Source". Beam Alpha, Inc. Sep. 27, 2021. pp. 1-3. PCT International Searching Authority.
"Written Opinion" for PCT Patent Application No. PCT/US21/36115 Titled: "Ion Source". Beam Alpha, Inc. Sep. 27, 2021. pp. 1-12. PCT International Searching Authority.
"International Preliminary Report on Patentability" for PCT Patent Application No. PCT/US21/36115 Titled: "Ion Source". Beam Alpha, Inc. Jan. 31, 2022. pp. 1-8. PCT International Searching Authority.
https://www.shinefusion.com/.
"Extended European Search Report" for European Patent Application No. 21822733.8. Titled: "Ion Source". Beam Alpha, Inc. Jun. 11, 2024. pp. 1-11. European Patent Office.
"Claims Amendment" for European Patent Application No. 21822733.8. Titled: "Ion Source". Beam Alpha, Inc. filed Jan. 9, 2023. pp. 1-5. European Patent Office.
Herfurth F et al: "A linear radiofrequency ion trap for accumulation, bunching, and emittance improvement of radioactive ion beams", Nuclear Instruments & Methods in Physics Research. Section A, Elsevier BV * North-Holland, NL, val. 469, No. 2, Aug. 11, 2001 (Aug. 11, 2001), pp. 254-275, XP004299029, ISSN: 0168-9002, DOI: 10.1016/S0168-9002(01)00168-1.
Dieter Gerlich: "On the Combination of a Low Energy Hydrogen Atom Beam With a Cold Multipole Ion Trap", Dec. 9, 2008 (Dec. 9, 2008), pp. 1-144, XP093169321.
Andelkovic Zoran et al: "Development of the Hitrap cooling trap and the EBIT offline ion source", Hyperfine Interactions, Publishing, Cham, Springer International val. 240, No. 1, Jun. 12, 2019 (Jun. 12, 2019), pp. 1-9, XP036804322, ISSN: 0304-3843, DOI: 10.1007/S10751-019-1605-8 [retrieved on Jun. 12, 2019].
Schramm U. et al: "Spatial Compression of Bunched Crystalline Ion Beams", Physica Scripta, val. T104, No. 1, Jan. 1, 2003 (Jan. 1, 2003), p. 189, XP0093162972, ISSN: 0031-8949, DOI: 10.1238/Physica.Topical.104a00189. Retrieved from the Internet: URL:https://iopscience.iop.org/article/10.1238/Physica.Topical.104a00189/ pdf.
Wayne M Itano et al: "Cooling methods in ion traps", Physica Scripta, val. T59, Jan. 1, 1995 (Jan. 1, 1995) pp. 106-120, XP0055613209, GB ISSN: 0031-8949, DOI: 10.1088/0031-8949/1995/T59/013.
Helmut Wiedemann: "Transformation in Phase Space" In: "Particle Accelerator Physics", Jan. 1, 2015 (Jan. 1, 2015), XP093169358, ISBN: 978-3-319-18316-9 pp. 1-10, DOI: 10.1007/978-3-319-18317-6, Retrieved from the Internet: URL:https://link.springer.com/chapter/10.1007/978-3-319-18317-6_8.
S. Sels: "Doppler and sympathetic cooling for the investigation of short-lived radioactive ions", Physical Review Research, val. 4, No. 3, Sep. 1, 2022 (Sep. 1, 2022), XP093169304, College Park, US ISSN: 2643-1564, DOI: 10.1103/PhysRevResearch.4.033229.
https://www.madisonstartups.com/shine-phoenix-set-world-record/.
"Preliminary Amendment" for U.S. Appl. No. 17/926,614. Titled: "Ion Source". Beam Alpha, Inc. filed Nov. 20, 2022. pp. 1-9. USPTO.
"Application as filed" for Canadian Patent Application No. 3,178,871. Titled: "Ion Source". Beam Alpha, Inc. Nov. 15, 2022. pp. 1-15. Canadian Intellectual Patent Office. Canada.
"Second Preliminary Amendment" for U.S. Appl. No. 17/926,614. Titled: "Ion Source". Beam Alpha, Inc. filed May 22, 2023. pp. 1-8. USPTO.
"International Search Report and Written Opinion" for PCT Patent Application No. PCT/US21/47625 Titled: "Mixed Nuclear Power Conversion". Beam Alpha, Inc. Nov. 16, 2022. pp. 1-2. PCT International Searching Authority.

(56) References Cited

OTHER PUBLICATIONS

"Written Opinion" for PCT Patent Application No. PCT/US21/47625 Titled: "Mixed Nuclear Power Conversion", Beam Alpha, Inc. Nov. 16, 2022. pp. 1-18. PCT International Searching Authority.
"International Preliminary Report on Patentability" for PCT Patent Application No. PCT/US21/47625 Titled: "Mixed Nuclear Power Conversion". Beam Alpha, Inc. Nov. 16, 2022. pp. 1-16. PCT International Searching Authority.
"Office Action" for European Application No. 21862687.7. Titled: "Mixed Nuclear Power Conversion". Beam Alpha, Inc. Jul. 5, 2024. European Patent Office. pp. 1-4. Europe.
"Claims Amendment" for European Application No. 21862687.7. Titled: "Mixed Nuclear Power Conversion". Beam Alpha, Inc. filed Mar. 13, 2023. European Patent Office. pp. 1-10. Europe.
"Claims Amendment" for Canadian Application No. 3,182,303 . Titled: "Mixed Nuclear Power Conversion". Beam Alpha, Inc. filed Dec. 12, 2022. European Patent Office. pp. 1-17. Canadian Patent Office.
"Claims Amendment" for Japanese Application No. 2023-511604. Titled: "Mixed Nuclear Power Conversion". Beam Alpha, Inc. filed Feb. 13, 2023. European Patent Office. pp. 1-53. Japan.
Goldberg, Murrey D. and Le Blanc, James M. "Angular Distributions of the D (d, n)He3 Reaction for 5- to 12-Mev Deuterons" Phys. Rev. vol. 119, No. 6. Sep. 15, 1960. Lawrence Radiation Laboratory, University of California. pp. 1-8.
Goldberg, M.D., et al. "Angular Distributions of T(p, n)He3 Neutrons for 3.4- to 12.4-Mev Proto" Phys. Rev. 122, 1510—Published Jun. 1, 1961. Physical Review Journals Archive.
"The global fusion industry in 2024. The global fusion industry in 2024 Fusion Companies Survey by the Fusion Industry Association." pp. 1-48. US.
G. Serianni, et. al., "Neutralisation and Transport of Negative Ion Beams: Physics and Diagnostics", New J. Phys. 19 045003 (2017). DOI: 10.1088/1367-2630/aa64bd.
W.C. Elmore, et. al., "On the Inertial-Electrostatic Confinement of a Plasma", Phys. Fluids 2, 239 (1959). DOI: 10.1063/1.1705917.
D.C. Barnes and R.A. Nebel, "Stable, Thermal Equilibrium, Large-Amplitude, Spherical Plasma Oscillations in Electrostatic Confinement Devices", Phys. Plasmas 5, 2498 (1998). DOI: 10.1063/1.872933.
J. Park, et al., "Experimental Observation of a Periodically Oscillating Plasma Sphere in a Gridded Inertial Electrostatic Confinement Device", Phys. Rev. Lett. 95, 015003 (2005). DOI: 10.1103/PhysRevLett.95.015003.
Y. Gu, et al., "Pulsed Operation of Spherical Inertial-Electrostatic Confinement Device", Fusion Tech. 30, 1342 (1996). DOI: 10.13182/FST96-A11963135.
V.N. Goncharov, et.al., "Demonstration of the Highest Deuterium-Tritium Areal Density using Multiple-Picket Cryogenic Designs on OMEGA," Phys. Rev. Lett. 104, 165001 (2010). DOI: 10.1103/PhysRevLett.104.165001.
G.H. Miley, et. al., "Discharge Characteristics of the Spherical Inertial Electrostatic Confinement (IEC) Device", IEEE Trans. Plasma Sci. 25, No. 4, 733-9 (1997). DOI: 10.1109/27.640696.
M.K. Michalak, G.L. Kulcinski, and J.F. Santarius, "Exploring Non-Uniformities in Gun-to-Gun Performance on the Six Ion gun Fusion experiment (SIGFE)", Presented at the 14th U.S.-Japan IEC Workshop, College Park MD (2012). http://fti.neep.wisc.edu/presentations/michalak_iec2012.pdf.
R.L. Hirsch, "Experimental Studies of a Deep, Negative, Electrostatic Potential Well in Spherical Geometry", Phys. Fluids 11, 2486 (1968). DOI: 10.1063/1.1691842.
https://www.iaea.org/newscenter/news/what-is-nuclear-fusion.
https://www-nds.iaea.org/exfor/.
https://www.energy.gov/articles/doe-national-laboratory-makes-history-achieving-fusion-ignition.
https://www.youtube.com/watch?v=Wh5TUIzBwLw.
https://www.youtube.com/watch?v=t5wntLZCcYA.
"Office Action—Non-Final" issued Oct. 10, 2024, in U.S. Appl. No. 17/148,489. Titled "Ion Transport" for Beam Alpha, Inc. USPTO. pp. 1-14.
"Amendment and Response After Final" filed Oct. 1, 2024, in U.S. Appl. No. 17/148,489. Titled "Ion Transport" for Beam Alpha, Inc. USPTO. pp. 1-14.
"Office Action—Final Rejection" issued Aug. 19, 2024, in U.S. Appl. No. 17/148,489. Titled "Ion Transport" for Beam Alpha, Inc. USPTO. pp. 1-12.
"Amendment and Response to Non-Final" filed May 15, 2024, in U.S. Appl. No. 17/148,489. Titled "Ion Transport" for Beam Alpha, Inc. USPTO. pp. 1-68.
https://en.wikipedia.org/wiki/Colliding_beam_fusion#.
UNSW Newsroom, Dec. 15, 2017.
Rostoker et al. "Colliding beam fusion reactor" Conference: High-Power Particle Beams, 1998. BEAMS '98. Proceedings of the 12th International Conference. vol. 1, Feb. 1998.
A. G. Tarditi and J. J. Chapman, "Aneutronic Fusion Spacecraft Architecture: Phase I NIAC Study", NASA Institute for Advanced Concepts Report, NASA/CR-XXXXXX, 2001.
Eric J. Lerner, "Prospects for $p^{11}B$ Fusion with the Dense Plasma Focus: New Results", arXiv:physics/0401126, 2004.
Helion Energy, Inc. (n.d.). "How to make fusion electricity without ignition" Helion Energy. Retrieved Feb. 3, 2026.
Ligon, T. "The world's simplest fusion reactor revisited" (p. 5). $EMC^2$ Fusion Development Corporation. 2007.
Rider, T. H. "Fundamental limitations on plasma fusion systems not in thermodynamic equilibrium" (Doctoral thesis). Massachusetts Institute of Technology. 1995.
Maglich, B. C. "The migma principle of controlled fusion. Nuclear Instruments and Methods", 111(1-3), 213-217. 1973.
Miley, G. H., & Sved, J. "The IEC star-mode fusion neutron source for NAA—Status and next-step designs. Applied Radiation and Isotopes", 53(4-5), 779-783. 2000.
2025 Global Fusion Industry Report released by the Fusion Industry Association in Jul. 2025.
O'Toole et al., "NASA Mars exploration power study", 2001.
Klein, A. M. "Electron confinement and beam focusing for fusion applications". PhD Dissertation, Massachusetts Institute of Technology. 2008.
Klein, A. M., et al. "Experimental investigation of magnetically assisted inertial electrostatic confinement." Proceedings of the American Physical Society Division of Plasma Physics (APS-DPP). 2010.
Gabor, D. "A space-charge lens for the focusing of ion beams". Nature, vol. 160, Issue 4055, pp. 89-90 (1947).
Klein, A. M., et al. Multi-beam recirculating fusion experiments (Marble). 2011.
https://en.wikipedia.org/wiki/ITER.
https://en.wikipedia.org/wiki/Inertial_electrostatic_confinement.
HB11 Energy explainer, Good News Network, Oct. 25, 2021.
Helion Energy company blog, 2024.
Helion Energy. (n.d.). in Wikipedia. Retrieved Feb. 2026.
Michl Binderbauer, CEO of TAE Technologies, Jul. 20, 2022.
Michl Binderbauer, CEO, TAE Technologies, TAE Technologies Statement on US Nuclear Fusion Advancement (2021-2022).
HB11 Energy, UNSW press release, Dec. 2017.
Rider, T. H. "Fundamental limitations on plasma fusion systems not in thermodynamic equilibrium" Massachusetts Institute of Technology, Department of Electrical Engineering and Computer Science, Cambridge, Massachusetts 02139. 1997 American Institute of Physics. pp. 1-9.
"Promising Aspects of Colliding Beam Fusion in Literature" pp. 1-3.
https://en.wikipedia.org/wiki/Polywell.
"Reply Brief on Appeal on Behalf of Appellant" for U.S. Appl. No. 17/433,924, Titled: "Direct Nuclear Power Conversion". Beam Alpha, Inc., filed Jun. 2, 2025. pp. 1-81.
"Written Submissions in Advance of Oral Proceedings" for European Application No. 20770753.0. Titled: "Direct Nuclear Power Conversion". Beam Alpha, Inc. May 9, 2025. European Patent Office. pp. 1-17. Europe.

(56) References Cited

OTHER PUBLICATIONS

"Examination Report" for European Application No. 20770753.0. Titled: "Direct Nuclear Power Conversion". Beam Alpha, Inc. May 30, 2025. European Patent Office. pp. 1-7. Europe.
"Analytical investigation of neutron production rate in spherical IECF devices" The European Physical Journel D, Springer, vol. 69, No. 9, Sep. 24, 2015. pp. 1-8. Afsharmanesh Mohsen et. al.
"Examiner's Report" for Canadian Patent Application No. 3,131,901. Titled: "Direct Nuclear Power Conversion". Beam Alpha, Inc. Apr. 24, 2025. Canadian Intellectual Patent Office. pp. 1-5. Canada.
"Response to Communication pursuant to Article 94(3) and 70a(2) EPC" for European Application No. 21854417.9. Titled: "Sulfur Blanket". Beam Alpha, Inc. Mar. 26, 2025. European Patent Office. pp. 1-3. Europe.
https://world-nuclear.org/information-library/current-and-future-generation/nuclear-fusion-power.aspx.
"Amendment and Response" for European Patent Application No. 21822733.8. Titled: "Ion Source". Beam Alpha, Inc. filed Mar. 19, 2025. pp. 1-10. Europe.
"Notice of Allowance" for Canadian Patent Application No. 3,178,871. Titled: "Ion Source". Beam Alpha, Inc. Jun. 23, 2025. pp. 1-1. Canadian Intellectual Patent Office. Canada.
"Amendment and Response to Examiner's Report" filed Jun. 16, 2025, in Canadian Patent Application No. 3,182,404. Titled "Mixed Nuclear Power Conversion" for Beam Alpha, Inc. pp. 1-84. Canada.
"Amendment and Response to Extended Search Report" filed Apr. 10, 2025, in European Patent Application No. 21862687.7. Titled "Mixed Nuclear Power Conversion" for Beam Alpha, Inc. pp. 1-9. Europe.
"Examiner's Report" dated Feb. 17, 2025, in Canadian Patent Application No. 3,182,404. Titled "Mixed Nuclear Power Conversion" for Beam Alpha, Inc. European Patent Office. pp. 1-6.
"Theory of the Alternation Gradient-Gradient Synchrotron" Courant E.D. et al. Brookhaven National Laboratory, New York. Jul. 15, 1957. pp. 1-49.
https://en.wikipedia.org/wiki/Strong_focusing.
"Office Action" dated Apr. 22, 2025, in Japanese Patent Application No. 2023-511604. Titled "Mixed Nuclear Power Conversion" for Beam Alpha, Inc. Japanese Patent Office. pp. 1-5.
"Preliminary Amendment" for U.S. Appl. No. 19/171,305. Titled: "Ion Source". Beam Alpha, Inc. filed Apr. 6, 2025. pp. 1-10. US.
"Second Preliminary Amendment" filed Jul. 1, 2025, in U.S. Appl. No. 18/025,893. Titled "Mixed Nuclear Power Conversion" for Beam Alpha, Inc. pp. 1-64. US.
Rider, T. H. "Fundamental limitations on plasma fusion systems not in thermodynamic equilibrium" Massachusetts Institute of Technology, Department of Electrical Engineering and Computer Science, Cambridge, Massachusetts. Jun. 1995 American Institute of Physics. pp. 1-328.
Jackson, Gerald P. "Nuclear Emerging Technology in Space" (NETS 2024) conference. pp. 1-2.
https://law.justia.com/cases/federal/appellate-courts/F2/229/457/202439/.
"Applicant's Summary of Interview with Examiner" filed Jun. 2, 2026, in U.S. Appl. No. 18/025,893, titled "Mixed Nuclear Power Conversion". pp. 1-8.
"Amendment and Response" filed Jun. 5, 2026, in U.S. Appl. No. 18/025,893, titled "Mixed Nuclear Power Conversion". pp. 1-102.
"Delaration of Gerald Peter Jackson" filed Jun. 5, 2026, in U.S. Appl. No. 18/025,893, titled "Mixed Nuclear Power Conversion". pp. 1-27.
"Examiner Interview Summary Record" dated Jun. 8, 2026, in U.S. Appl. No. 18/025,893, titled "Mixed Nuclear Power, Conversion". pp. 1-5.

* cited by examiner

SULFUR BLANKET

PRIORITY

This application claims the benefit of U.S. Provisional Patent Application No. 63/036,029, Titled: "Sulfur Blanket," filed Jun. 8, 2020. This U.S. Provisional Patent Application No. 63/036,029 is hereby incorporated by reference in its entirety as if fully restated herein.

1. BACKGROUND

Nuclear fusion is generally defined as the process by which lighter nuclei are merged to form heavier nuclei. For lighter nuclei the fusion process liberates energy in the form of kinetic energy in the residual particles. The vast majority of past attempts at generating electrical power from fusion reactions have contemplated boiling water to drive conventional turbines (an example of a means approximated by a Carnot cycle). These past attempts have often utilized strong magnetic fields to constrain plasmas of electrons and ions until the ions collide and fuse. Such magnetic containment is prone to instabilities and particle leakage, causing inadvertent and often catastrophic loss of energy that would otherwise be needed to sustain fusion reactions.

The electrons within the plasma present their own set of difficulties. First, because electrons are much lighter than ions, electromagnetic collisions between electrons and ions tend to rob the ions of the kinetic energy needed for the fusion process. Second, these scattered electrons tend to be relativistic, emitting photonic radiation when they collide or accelerate. This photonic radiation is also a large source of energy leakage, robbing the plasma of the energy needed to sustain fusion reactions. The elimination of electrons from nuclear fusion reactions is taught in U.S. Provisional Patent Application No. 62/811,485 filed Feb. 27, 2019 and titled "Direct Nuclear Power Conversion" by one of the applicants of this instant application. The PCT application PCT/US20/19449 titled "Direct Nuclear Power Conversion" was filed Feb. 24, 2020 and claims the benefit of U.S. Provisional Patent Application No. 62/811,485. Both 62/811,485 and PCT/US20/19449 are incorporated by reference into this instant application.

There is a class of nuclear fusion reactions referred to as aneutronic. In these reactions very little of the energy liberated by the reactions is in the form of kinetic energy in neutrons. Aneutronic fusion reactions are also taught in 62/811,485 and PCT/US20/19449.

There are other nuclear fusion reactions that generate neutrons wherein a significant or majority of the released reaction energy is in the form of neutron kinetic energy. This neutron kinetic energy is converted into electrical power through their absorption in material in the form of heat which can be carried away by a working fluid in order to generate electrical power. A specific case is the mutual fusion of deuterium nuclei to generate neutrons with a kinetic energy of approximately 2.5 MeV. The mutual fusion of deuterium nuclei and the absorption of neutron kinetic energy in a working fluid is taught in U.S. Provisional Patent Application No. 62/995,168 filed Jan. 14, 2020 and titled "Transient Beam Compression Fusion" by one of the applicants of this instant application. Provisional patent 62/995,168 is incorporated by reference into this instant application.

In addition, the mutual fusion of deuterium nuclei and the amplification of energy release due to neutron moderation and absorption in a working fluid is taught in U.S. Provisional Patent Application No. 63/070,587 filed Aug. 26, 2020 and titled "Mixed Nuclear Power Conversion". Provisional patent 63/070,587 is incorporated by reference into this instant application.

The production of ion beams, such as deuteron beams, is taught in U.S. Provisional Patent Application No. 63/036,073 filed Jun. 8, 2020 and titled "Ion Source". Provisional patent 63/036,073 is incorporated by reference into this instant application.

Higher kinetic energy neutrons such as those emanating from the fusion of tritium and deuterium ions (DT fusion) pose a significant radiological risk to nearby personnel and are very difficult to shield. Large doses of DT fusion neutrons in metals cause embrittlement and dimensional changes, compromising the functionality and integrity of the reactor. Another problem with DT fusion is the need to produce the fuel component tritium.

Another form of nuclear interaction is antimatter annihilation reactions. Take for example a negatively charged antiproton drifting into uranium, even depleted uranium U238. Note that 99% of antiprotons that stops in uranium induces fission. When a low kinetic energy antiproton strikes a target, it quickly decelerates due to scattering against electrons in the target. At thermal energies the antiproton will only penetrate a few atomic layers into the target. When the negatively-charged antiprotons decelerate to kinetic energies of a few electron-Volts they displace an orbiting outer-shell electron. Because antiprotons are fermions with different quantum numbers than electrons, they quickly cascade down to the ground state and annihilate against one of the nucleons (proton or neutron) in the nucleus. The absorption by the nucleus of one of the pi-mesons that emanate from this annihilation induces the nuclear fission. Unlike neutron induced fission, the isotope of uranium is irrelevant. Depleted uranium U238 undergoes antiproton-induced fission just as easily as fissile U235. Unlike weapons-grade fissile materials such as U235, there are minimal regulatory controls on the handling of U238. This significantly reduces research costs and administrative overhead, allowing development of the technology to progress much faster than otherwise possible. One aspect of antimatter annihilation reactions as a trigger for nuclear fission is that an average of 16 neutrons are generated per fission event. If it were possible to harvest 8.64 MeV of energy per neutron, this would generate 138 MeV of energy in addition to the approximately 240 MeV generated by the fission event itself.

Antimatter annihilation reactions are also useful for other purposes such as the elimination of unwanted biological cells. United State U.S. Pat. No. 9,630,021 invented by an inventor of the instant application Gerald Jackson titled "Antiproton Production and Delivery for Imaging and Termination of Undesirable Cells" describes such an application. U.S. Pat. No. 9,630,021 is hereby incorporated by reference as if fully stated herein.

Another type of nuclear reaction that produces neutrons is the reaction Li7(p,n)Be7, wherein an incident proton at a kinetic energy above the threshold of 1.9 MeV on a lithium-7 target produces a very low energy neutron and a residual beryllium-7 atom.

The exchange of protons for neutrons on targets is the basis of energy amplifiers, which are described in International Patent Application PCT/EP94/02467 titled "An Energy Amplifier for Clean Nuclear Energy Production Driven by a Particle Beam Accelerator" invented by Nobel Prize winner Carlo Rubbia. PCT/EP94/02467 is hereby incorporated by reference as if fully stated herein. Accordingly, there is a need for improvement over such past approaches.

II. SUMMARY

The disclosure below uses different prophetic embodiments to teach the broader principles with respect to articles of manufacture, apparatuses, processes for using the articles and apparatuses, processes for making the articles and apparatuses, and products produced by the process of making, along with necessary intermediates, directed to nuclear power multiplication and conversion.

This Summary is provided to introduce the idea herein that a selection of concepts is presented in a simplified form as further described below. This Summary is not intended to identify key features or essential features of subject matter, nor this Summary intended to be used to limit the scope of claimed subject matter. Additional aspects, features, and/or advantages of examples will be indicated in part in the description which follows and, in part, will be apparent from the description, or may be learned by practice of the disclosure.

References cited herein are incorporated by reference as if fully stated herein. The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

With the foregoing in mind, consider an apparatus (method of making, method of using) including power plant of output electrical power constructed so as to produce more of said output electrical power than electrical power input to the apparatus, e.g., by bringing into collision ions so as to induce fusion reactions. In some embodiments herein, the power plant: (1) can be devoid of a magnetic field that constrains a plasma; (2) can be such that energy released from the fusion reactions is amplified by secondary nuclear reactions in a material surrounding said fusion reactions caused by neutrons; (3) or can be both. Illustratively, consider the reaction of deuterium-deuterium (DD) fusion surrounded by a region of sulfur to teach the broader concepts of producing such electrical power. In other embodiments, fusion reactions are replaced by antimatter-induced nuclear fission or other nuclear reactions that also produce neutrons, said reactions also surrounded by a region of sulfur.

III. INDUSTRIAL APPLICABILITY

Industrial applicability is representatively directed to that of apparatuses and devices, articles of manufacture—particularly electrical—and processes of making and using them. Industrial applicability also includes industries engaged in the foregoing, as well as industries operating in cooperation therewith, depending on the implementation.

IV. DRAWINGS

In the non-limiting examples of the present disclosure, please consider the following:

V. DETAILED DISCLOSURE OF MODES

The following detailed description is directed to concepts and technologies for direct nuclear power conversion into electrical power by fusion reactions, teaching by way of prophetic illustration. The disclosure includes an apparatus comprising a generator of output electrical power in a construction to bring into collision ions so as to induce nuclear fusion reactions and thereby produce more of said output electrical power than electrical power input to the apparatus. Similarly, the following disclosure teaches a method of generating electrical power, the method comprising generating more output electrical power than electrical power input to an apparatus by bringing into collision, in said apparatus, one or more species of ions so as to induce nuclear fusion reactions. These are indicative of how to make such an apparatus as well as necessary intermediates produced in the methods.

In contrast to past attempts at nuclear fusion for the purposes of electrical power generation, this disclosure teaches an apparatus comprising an electrical power plant that can be devoid of a magnetic field that contains a plasma comprised of said ions brought into said collisions. It also describes a method of bringing ions into collision in ways that can be devoid of constraining a plasma with a magnetic field.

A. Harvesting Energy with Neutrons

Figure 1:
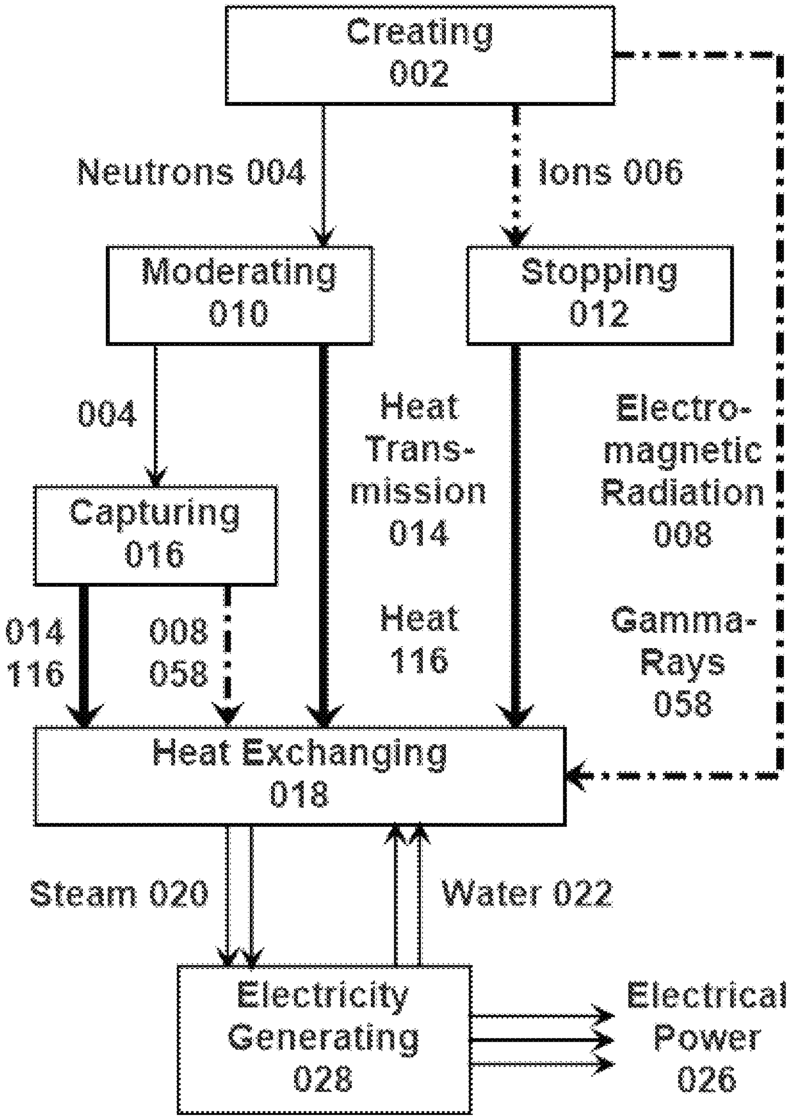
FIG. 1 is an illustration of a method of producing electrical power [026] from a process creating [002] neutrons [004].

One teaching embodiment for teaching broader concepts is directed to a method of harvesting energy with neutrons from a sulfur blanket [104] surrounding a region in which neutrons [004] created, sometimes in conjunction with the creation of ions [006] and electromagnetic radiation [008]. Electromagnetic radiation [008] is generally defined as electrons [054], positrons [056], and gamma-rays [058] across the entire electromagnetic spectrum. The process of creating [002] neutrons [004] and the subsequent method of harvesting energy from said neutrons [004], ions [006], and electromagnetic radiation [008] is illustrated in FIG. 1.

After the process of creating [002] the neutrons generally undergo a process of moderating [010] wherein the kinetic energy carried by the neutrons [004] is reduced. The lost kinetic energy is generally converted into heat [116] and subsequent heat transmission [014]. The vast majority of neutrons undergo the process of moderating [010] before they undergo a subsequent process of capturing [016], wherein a neutron [004] is absorbed by an atom via nucleon exchange reactions [076] such as neutron [004] absorption with a subsequent emission of a gamma-ray [058](referred to as a (n,g) reaction [088]). Other relevant neutron capture channels are neutron-proton (n,p) [092] and neutron-alpha (n,a) [090] exchanges. It is sometime possible for the capturing [016] process by an atom to be immediately preceded by transfer of neutron [004] kinetic energy to that same atom, also deemed moderating [010]. The process of capturing [016] generates more heat [116] and subsequent heat transmission [014] and additional electromagnetic radiation [008].

In parallel, the process of creating [002] may also generate ions [006]. These ions will generally undergo the process of stopping [012], wherein the kinetic energy lost by the ions is also converted into heat [116] and subsequent heat transmission [014]. The heat transmission [014] and electromagnetic radiation [008] from the processes of creating [002], moderating [010], capturing [016], and stopping [012] are all then subjected to the process of heat exchanging [018].

The process of creating [002] neutrons [004] is generally, but not necessarily, the result of nuclear reactions [102]. Such nuclear reactions [102] may comprise nuclear fission

Figure 2:
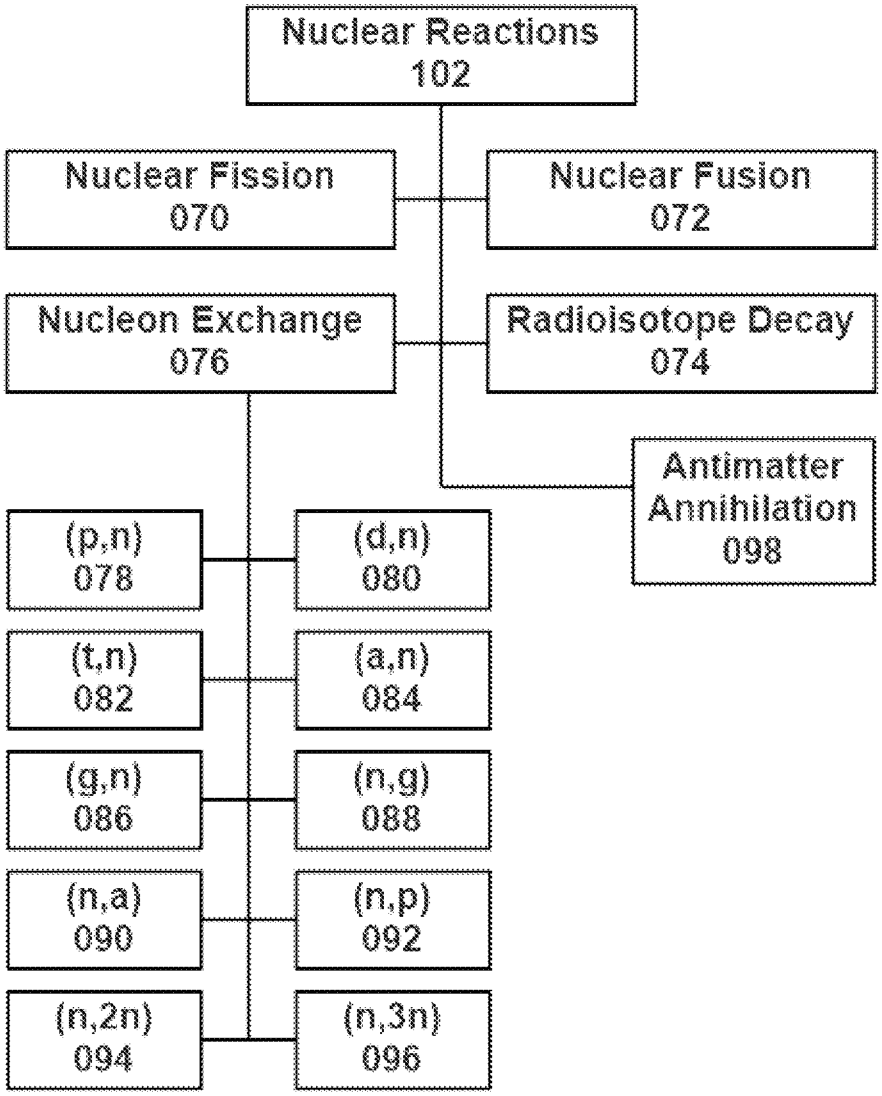
FIG. 2 is a list of nuclear reaction [102] that produce neutrons [004] in a creating [002] process or that absorb neutrons [004] in a capturing [016] process.

[070], nuclear fusion [072], radioisotope decay [074], antimatter annihilation reactions [098], or nucleon exchange reactions [076] such as proton-neutron (p,n) reactions [078]. Nucleon exchange reactions [076] that produce neutrons [004] are generally induced by bombarding atoms with energetic particles such as the protons in the (p,n) reactions [078] or energetic photons [008] in the (g,n) reactions [086]. There are dozens of possible nucleon exchange reactions [076], including gamma-neutron (g,n) [086], alpha-neutron (a,n) [084], deuteron-neutron (d,n) [080], triton-neutron (t,n) [082], or even neutron multiplication reactions such as (n,2n) [094] or (n,3n) [096] processes. One of ordinary skill in the art of nuclear physics would be generally familiar with the types of reactions that can create free neutrons. Many of these possible nuclear reactions capable of creating [002] neutrons [004] are summarized in FIG. 2.

Figure 3:
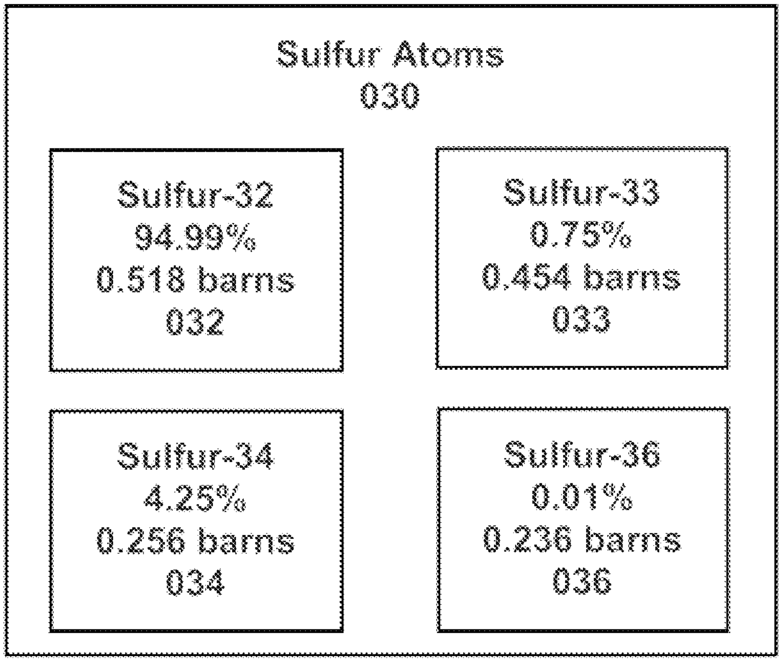
FIG. 3 is a list of isotopes of sulfur atoms [030] found in nature on Earth including for each isotope the natural abundance and the thermal neutron capture cross section.

In one embodiment, a prophetic teaching, sulfur atoms [030] are used for the step of capturing [016] neutrons [004]. FIG. 3 illustrates the abundances and thermal neutron cross sections for stable isotopes found on Earth. Note that the vast majority of naturally occurring sulfur is composed of the isotope sulfur-32 [032]. Most of the remaining naturally occurring sulfur is in the form of isotope sulfur-34 [034]. The isotopes sulfur-33 [033] and sulfur-35 [035] are only found in trace amounts in nature.

Figure 4:
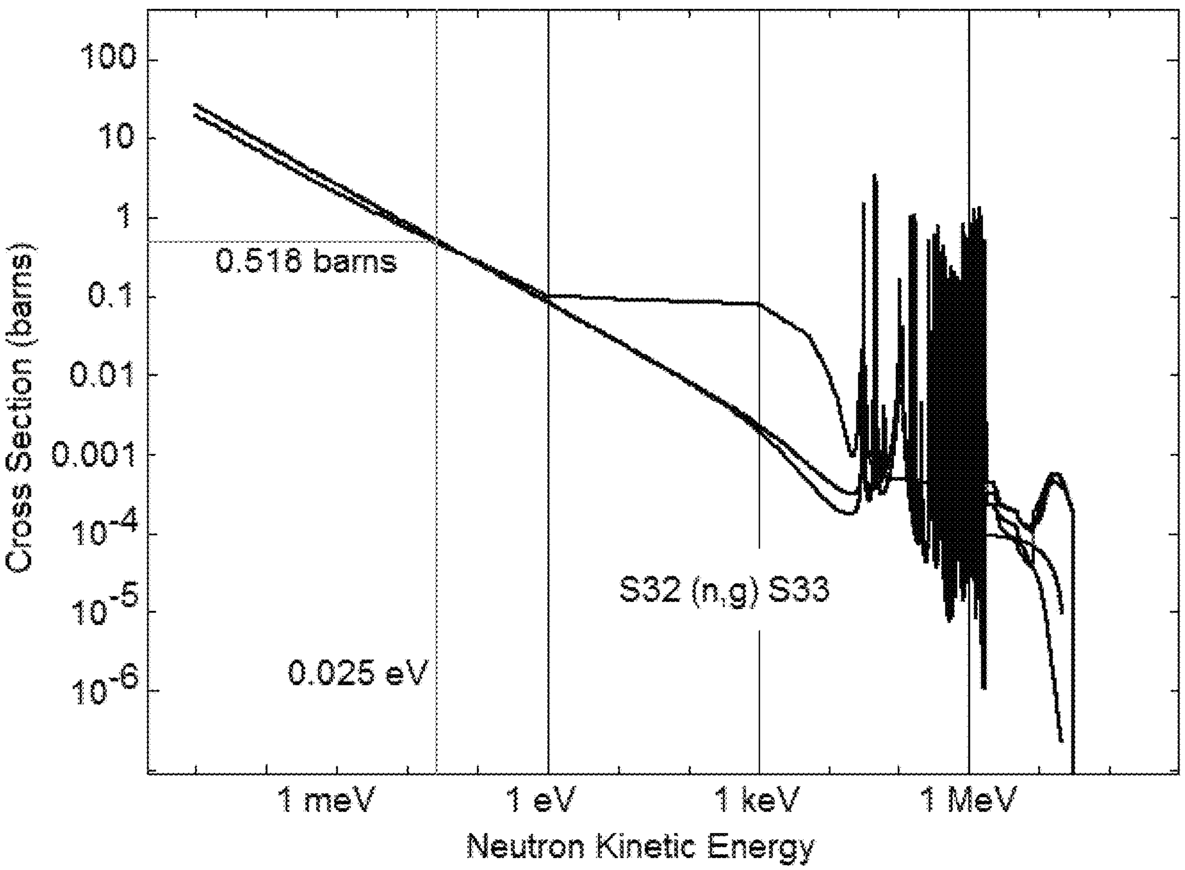
FIG. 4 is a plot of published experimental data showing the (n,g) [088] neutron [004] capture cross section as a function of neutron kinetic energy.

The thermal neutron cross sections specified in FIG. 3 are determined by the capturing [016] of neutrons [004] in thermal equilibrium with sulfur atoms [030] at room temperature. The cross section is proportional to the probability of a neutron being absorbed (capturing [016]) by an atom. Room temperature corresponds to a typical neutron kinetic energy of 0.025 eV. For example, the published data for the (n,g) [088] nucleon exchange reaction [076] for sulfur-32 [032] is plotted in FIG. 4. Three published data sets are plotted, with typical experimental errors causing the three sets to diverge in places. The general message is that the lower the temperature, the greater the (n,g) [088] cross section. First, note that upon capturing [016] a neutron [004] the atom changes from the isotope sulfur-32 [032] to the isotope sulfur-33 [033]. Second, note that at the thermal equilibrium kinetic energy of 0.025 eV the plotted cross section of 0.518 barns agrees with the stated value in FIG. 3. Also note that for a molten sodium blanket [104] the temperature of the sodium atoms [038] is much higher than room temperature, reducing the actual neutron capture cross section that is observed.

Figure 5:
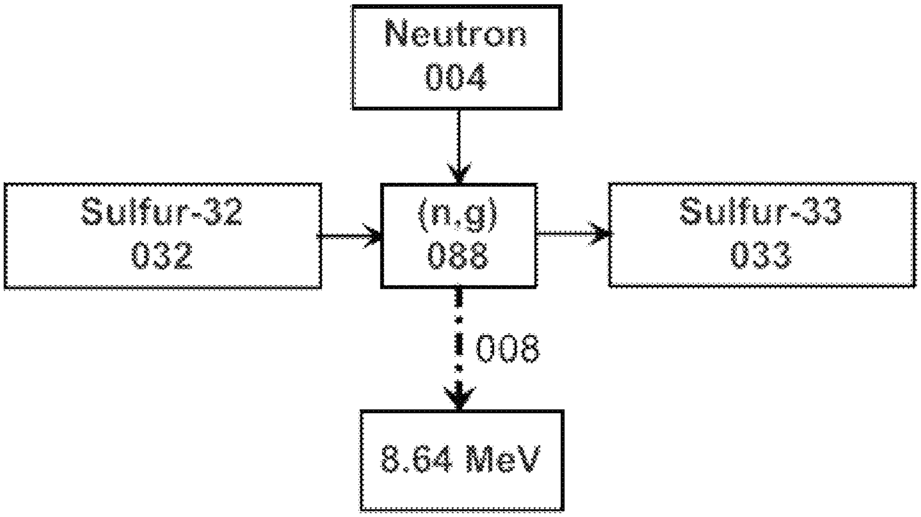
FIG. 5 is an illustration of the isotope sulfur-32 [032] capturing [016] a neutron [004] via the (n,g) [088] reaction to form sulfur-33 [033] and emit 8.64 MeV of electromagnetic radiation [008].

The prophetic embodiment wherein sulfur atoms [030] are involved in capturing [016] neutrons [004] is of interest because of the large energy release that occurs. As illustrated in FIG. 5 for the case of sulfur-32 [032] capturing [016] neutrons [004], the result is the generation of sulfur-33 [033] and the emission of electromagnetic radiation [008]. The mass difference between the initial state (a free neutron [004] and a sulfur-32 [032] atom) and final state (a sulfur-33 [033] atom) is 8.64 MeV/$c^2$. According to the principle of energy conservation and the famous equation $E=mc^2$, the amount of electromagnetic radiation [008] is equal to this mass difference, or 8.64 MeV. In summary, neutron [004] capturing [016] is performed with sulfur atoms [030] comprising isotope sulfur-32 [032] atoms.

Figure 6:
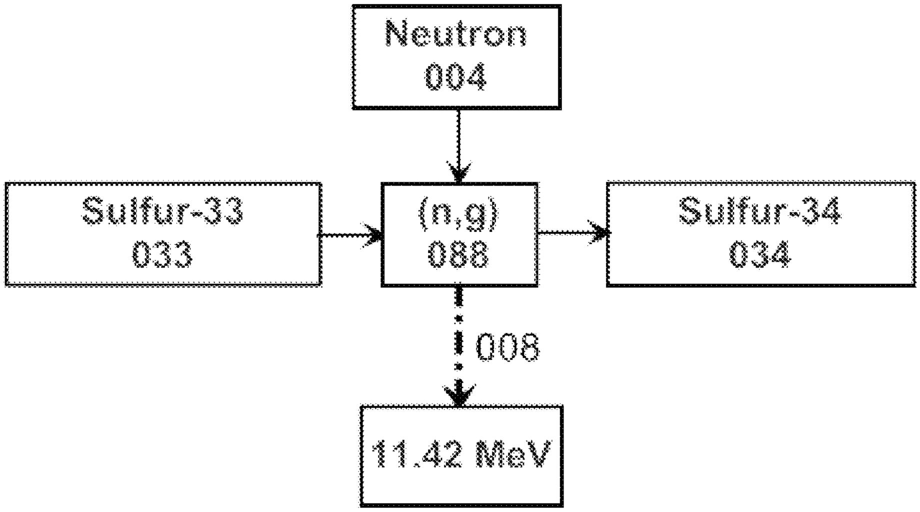
FIG. 6 is an illustration of the isotope sulfur-33 [033] capturing [016] a neutron [004] via the (n,g) [088] reaction to form sulfur-34 [034] and emit 11.42 MeV of electromagnetic radiation [008].

A similar situation is illustrated in FIG. 6 wherein sulfur-33 [033] capturing [016] a neutron [004] yields sulfur-34 [034] and the release of 11.42 MeV of energy. In summary, neutron [004] capturing [016] is performed with sulfur atoms [030] comprising isotope sulfur-33 [033] atoms.

Figure 7:
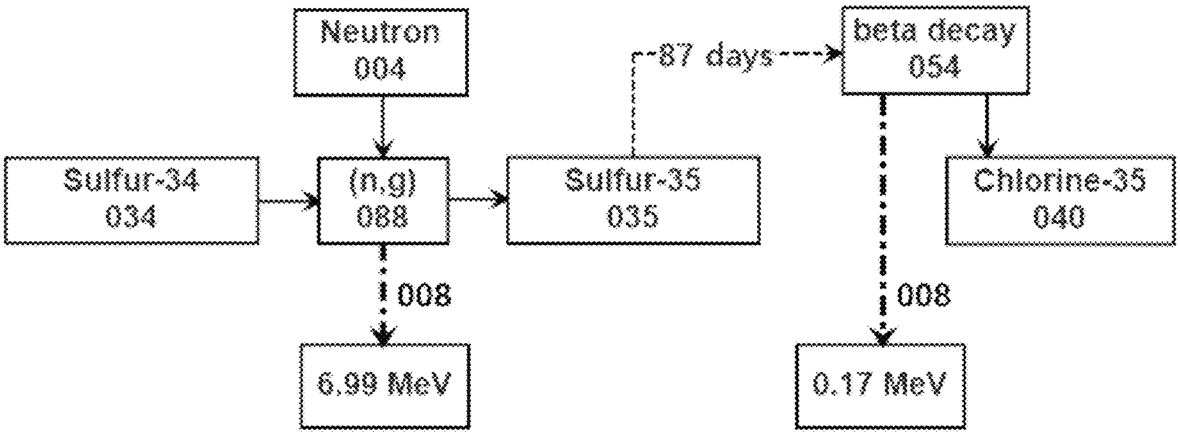
FIG. 7 is an illustration of the isotope sulfur-34 [034] capturing [016] a neutron [004] to form sulfur-35 [035] and emit 6.99 MeV of electromagnetic radiation [008]. Sulfur-35 [035] then undergoes beta decay with a half-life of 87 days to form chlorine-35 [040] with the additional release of 0.17 MeV of electromagnetic radiation [008].

As illustrated in FIG. 7, a similar reaction takes place upon sulfur-34 [034] capturing [016] a neutron [004] to yield sulfur-35 [035] and the release of 6.99 MeV of energy in the form of electromagnetic radiation [008]. In summary, neutron [004] capturing [016] is performed with sulfur atoms [030] comprising isotope sulfur-34 [034] atoms. Because the isotope sulfur-35 [035] is radioactive, decaying into chlorine-35 [040] via beta decay with a half-life of 87 days, the mass difference between the initial state (sulfur-35 atom [035]) and final state (chlorine-35 atom [040] plus emitted beta particle/electron [054]) results in the emission of another 0.17 MeV of electromagnetic radiation [008].

As illustrated in FIG. 7, a similar reaction takes place upon sulfur-36 [036] capturing [016] a neutron [004] to yield sulfur-37 [037] and the release of 4.30 MeV of energy in the form of electromagnetic radiation [008]. In summary, neutron [004] capturing [016] is performed with sulfur atoms [030] comprising isotope sulfur-36 [036] atoms. Because the isotope sulfur-37 [037] is radioactive, decaying into chlorine-37 [042] via beta decay with a half-life of 5 minutes, the mass difference between the initial state (sulfur-37 atom [037]) and final state (chlorine-37 atom [042] plus emitted beta particle/electron [054]) results in the emission of another 4.87 MeV of electromagnetic radiation [008].

Because isotopic separation or isotopic enrichment is typically an expensive process, an embodiment is to perform the step of capturing [016] with naturally occurring sulfur. In this case capturing is performed with sulfur atoms [030] consisting of (or in some cases, having or consisting essentially of) the isotopes sulfur-32 [032], sulfur-33 [033], sulfur-34 [034], and sulfur-36 [036]. Because of its simplicity, an embodiment is to perform the step of moderating [010] also with sulfur atoms [030].

Figure 9:
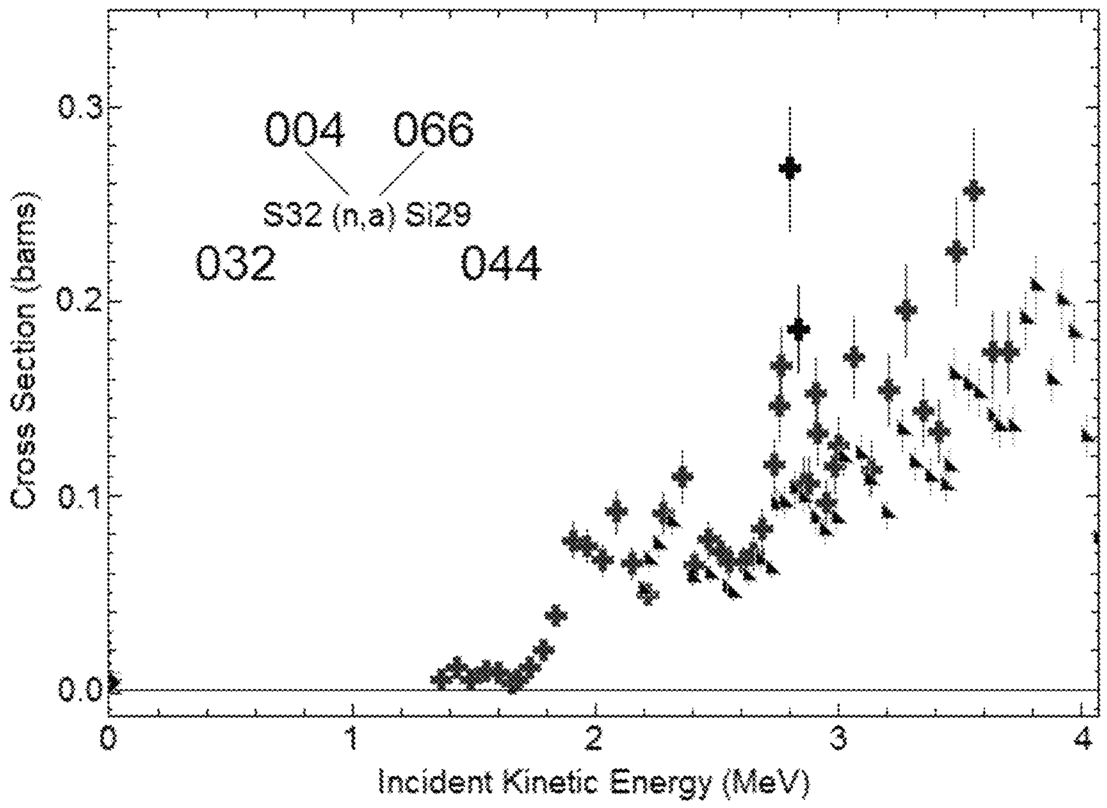
FIG. 9 is a plot of published experimental data showing the (n,a) [090] neutron [004] capture cross section as a function of neutron kinetic energy.
Figure 10:
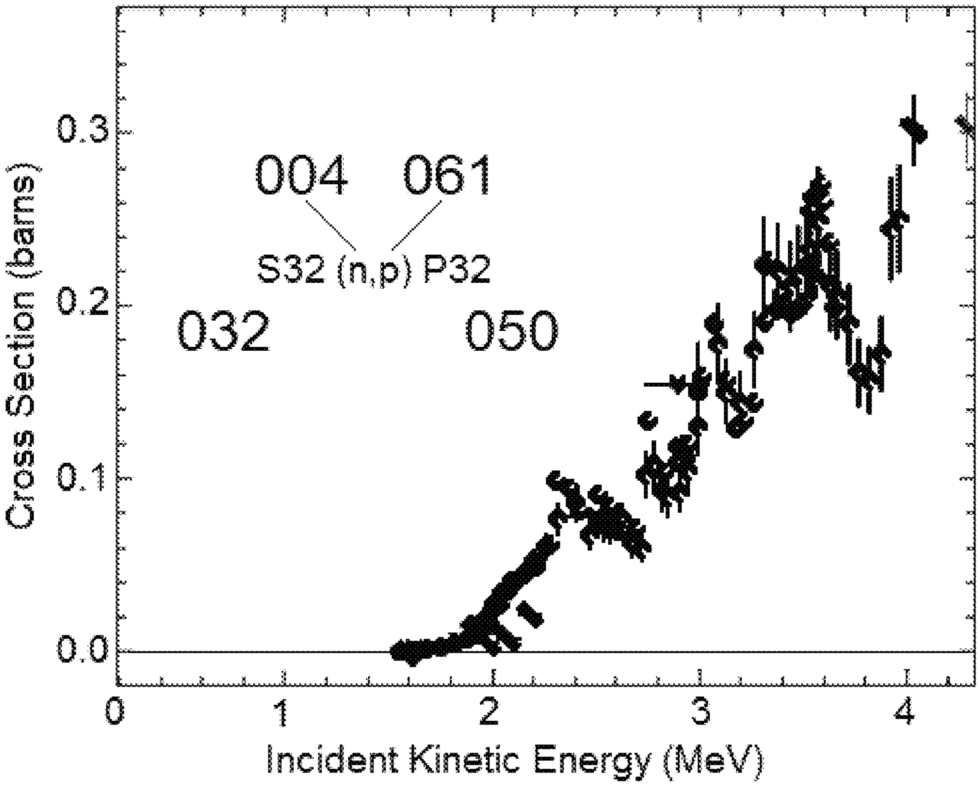
FIG. 10 is a plot of published experimental data showing the (n,p) [092] neutron [004] capture cross section as a function of neutron kinetic energy.

The capturing [016] of neutrons [004] can also take place because of other nucleon exchange reactions [076]. As a representative example, energetic neutrons [004] impinging on a sulfur-32 [032] atoms can sometimes liberate alpha particles/helium ions [066] via a (n,a) [090] reaction illustrated in FIG. 2. As plotted in FIG. 9, the (n,a) reaction cross section for producing silicon-29 [044] from sulfur-32 [032] is negligible for neutron kinetic energies below 1.7 MeV. As another representative example, energetic neutrons [004] impinging on a sulfur-32 [032] atoms can sometimes liberate protons/hydrogen ions [061] via a (n,p) [092] reaction. As plotted in FIG. 10, the (n,p) reaction cross section for producing phosphorus-32 [050] from sulfur-32 [032] is negligible for neutron kinetic energies below 1.8 MeV. Depending on the neutron kinetic energy during the creating [002] step, the impact of these other nucleon exchange reactions [076] can vary. For high energy neutrons such as those generated by DT fusion these nucleon exchange reactions [076] can be the dominant mechanism for capturing [016] of neutrons [004].

The moderating [010] of neutrons [004] removes kinetic energy from the neutrons [004] imparted by the creating [002] process. This lost kinetic energy is converted into heat [116] and subsequent heat transmission [014]. The electromagnetic radiation [008] from the creating [002] and capturing [016] step is completely or partially absorbed by the sulfur atoms [030], converting the electromagnetic radiation [008] into heat [116] and subsequent heat transmission [014]. The stopping [012] of ions [006] emitted by creating [002] converts the ion kinetic energy into heat [116] and subsequent heat transmission [014]. Some or all of this heat transmission [014] and remaining (unconverted) electromagnetic radiation [008] is accumulated in a heat exchanging [018] process.

The purpose of heat exchanging [018] converting water [022] into steam [020]. The heat [116] and electromagnetic radiation [008] accumulated by heat exchanging [018] is delivered into the water [022] to cause it to boil and produce steam [020]. The steam is then used in the step of electricity generating [028], converting the steam [020] back into liquid water [022]. The result of electricity generating [028] is the output of electrical power [026].

An embodiment is a method of electricity generating [028] wherein the amount of output electrical power [026] resulting from said electricity generating [028] is greater than the total amount of electricity required (or in some cases, used) to perform the steps of creating [002], moderating [010], stopping [012], transmitting, capturing [016], heat exchanging [018], converting, and generating [028]. This condition is generally referred to as breakeven, or breakeven energy production. Another embodiment is a method of electricity generating [028] wherein the amount of output electrical energy resulting from said electricity generating [028] is greater than the total amount of electrical energy required (or in some cases, used) to carry out the steps of creating [002], moderating [010], stopping [012], heat transmission [014], capturing [016], heat exchanging [018], converting, and generating [028]. The above two embodiments are equivalent in the absence of a means for storing energy by electrical or thermal means.

In summary, FIG. 1 illustrates a method of producing electrical power [026], the method comprising: creating [002] neutrons [004] via nuclear reactions [102], said neutrons [004] carrying neutron kinetic energy; moderating [010] said neutrons [004] to thermal energies to produce moderated neutrons, converting the neutron kinetic energy into heat, and transmitting [014] said heat to a heat exchanger [118]; creating ions [006] via the nuclear reactions [102], stopping [012] the ions [006] to produce heat, and transmitting [014] to said heat exchanger [118] the heat generated by the stopping [012] of the ions [006]; capturing [016] said moderated neutrons with sulfur atoms [030] to produce heat [116], and transmitting [014] to said heat exchanger [118] energy released by the capturing [016] of said moderated neutrons; transmitting energy from decaying radioisotopes created by the capturing [016] of said moderated neutrons to said heat exchanger [118]; heat exchanging [018] at least some of each said heat and energy in said heat exchanger [118] by converting water [022] into steam [020]; and generating [028] electrical power [026] with said steam [020].

Figure 15:
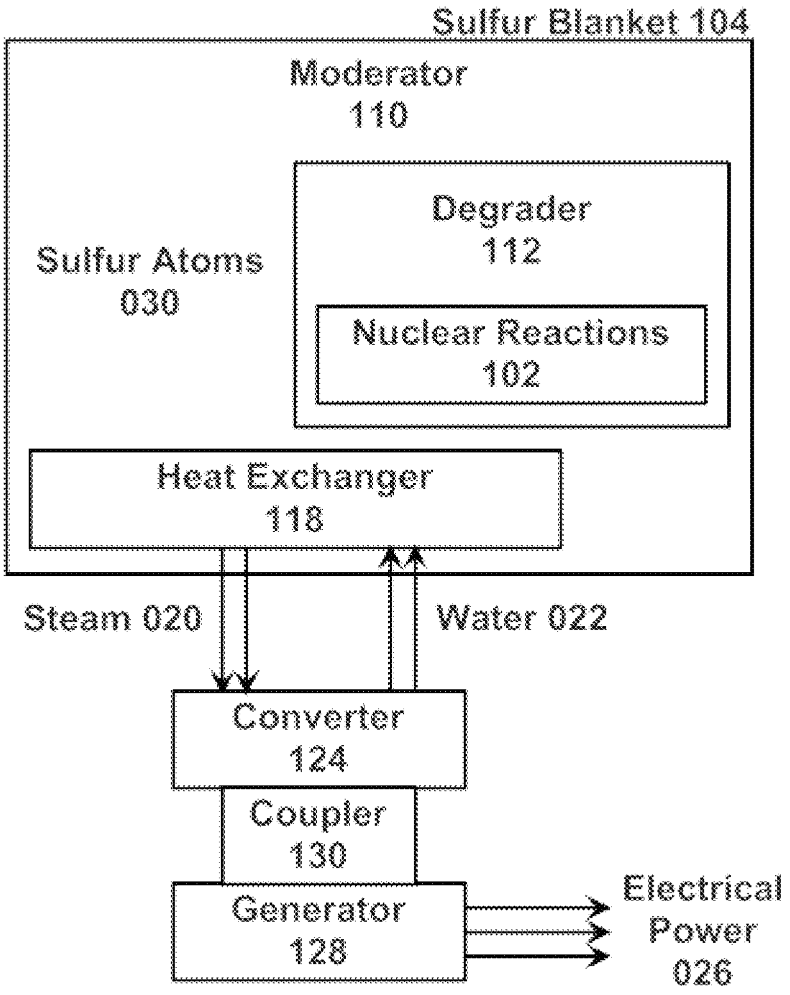
FIG. 15 is an illustration of an embodiment of harvesting energy from nuclear reactions [102] within a surrounding sulfur blanket [104] in order to generate [028] electrical power [026].
Figure 16:
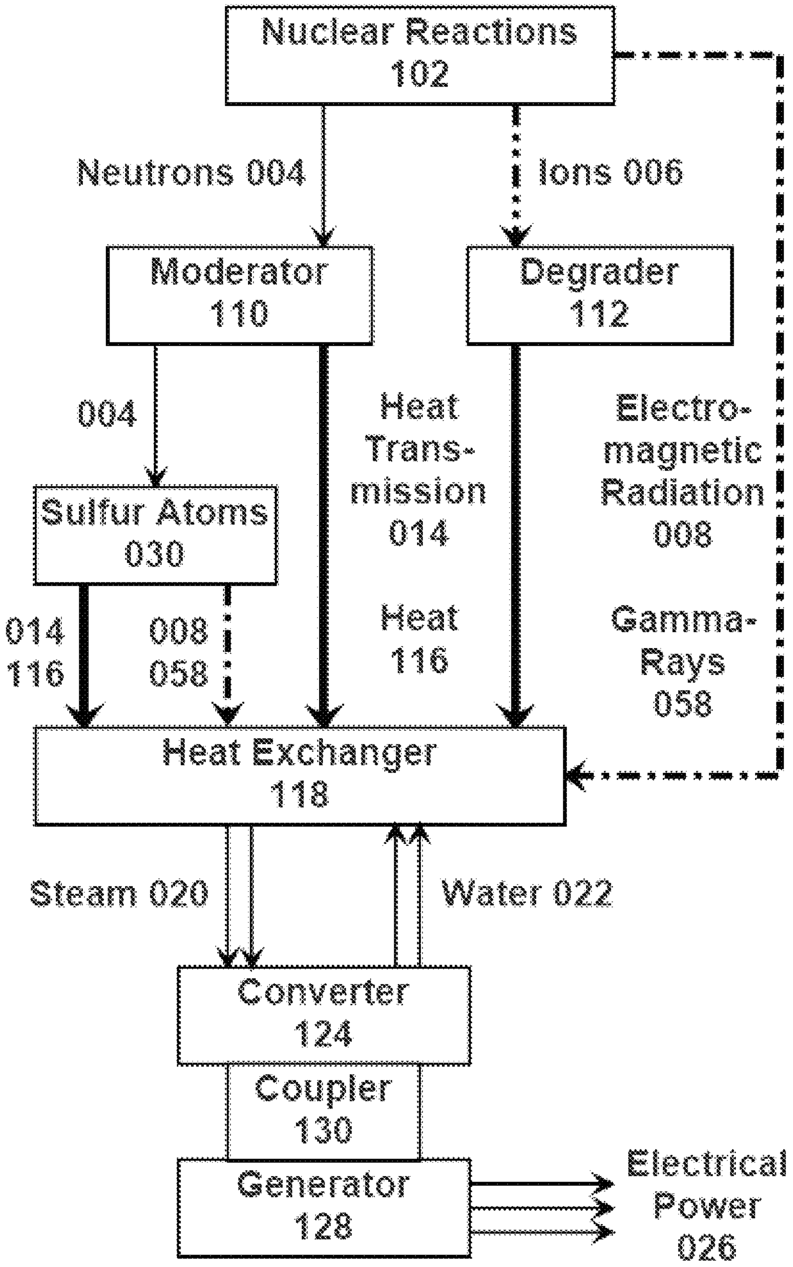
FIG. 16 is an illustration of an embodiment of harvesting energy from nuclear reactions [102] in order to produce electrical power [026].

FIGS. 15 and 16 illustrates an apparatus to convert energy from nuclear reactions [102] into electrical power, the apparatus including; one or more regions in which nuclear reactions occur and thereby create [002] neutrons [004], ions [006], and electromagnetic radiation [008]; one or more degraders [112], surrounding said one or more regions, that stop [012] the ions [006] and absorbs the electromagnetic radiation [008] emanating from said one or more regions and convert substantially all kinetic energy of the ions [006], and substantially all of the electromagnetic radiation [008], into heat [116]; one or more moderators [110], surrounding said one or more degraders [112], that slow down neutrons [004] emanating from said one or more regions, and that pass through said one or more degraders [112], that convert substantially all kinetic energy of said neutrons [004] into heat [116]; a plurality of sulfur atoms [030], within said one or more moderators [110], that capture [016] neutrons [004] slowed down in said one or more moderators [110] and that convert energy released by said capture of said neutrons [004] into heat [116]; wherein said one or more moderators [110] is configured to absorb the electromagnetic radiation [008] and absorb heat [116] generated by radioactive decay [074] of said sulfur atoms [030]; one or more heat exchangers [118], in thermal communication [014] with said one or more moderators [110], water [022] flowing through said one or more heat exchangers [118] to produce steam [020]; one or more converters [124], through which said steam [020] flows, adapted to convert [024] thermal energy into another form of energy; one or more couplers [130], connected to said one or more converters [124]; and one or more generators [128], that receive said energy converted [024] in said one or more converters [124] via said one or more couplers [130], and thereby generate [028] electrical power [026].

Another embodiment is an apparatus to convert energy from nuclear reactions [102] into electrical power [026], the apparatus including: one or more regions in which nuclear reactions [102] occur; one or more degraders [112] that stop ions [006] emanating from said one or more regions by transforming substantially all kinetic energy of said ions [006] into heat [116]; one or more moderators [110] that slow down neutrons [004] emanating from said one or more regions by converting substantially all kinetic energy of said neutrons [004] into heat [116]; a plurality of sulfur atoms [030] that capture neutrons [004] slowed down in said one or more moderators [110] and that convert energy released by said capture of neutrons [004] into heat [116]; one or more heat exchangers [118] in thermal communication [014] with said one or more degraders [112], said one or more moderators [110], and said sulfur atoms [030], wherein each said heat exchanger [118] is positioned to absorb electromagnetic radiation [008] emanating from said one or more regions; and positioned to absorb electromagnetic radiation [008] and heat [1116] generated by radioactive decay of said sulfur atoms [030]; water [022] flowing through said heat exchanger [118] to produce steam [020]; one or more converters [124], through which said steam [020] flows, and adapted to convert [024] thermal energy into another form of energy; one or more couplers [130] connected to said one or more converters [124]; and one or more generators [128] that receive said energy converted in said one or more converters [124] via said one or more couplers [130] and produce electrical power [026] therefrom.

In one embodiment of the above apparatus, the said nuclear reactions [102] include nuclear fission [070] reactions. In another embodiment of the above apparatus, the said nuclear reactions [102] include nuclear fusion [072] reactions. Specifically, one embodiment of these nuclear fusion [072] reactions include the fusion of deuterium nuclei [062] with other deuterium nuclei [062]. In another embodiment of the above apparatus, the said nuclear reactions [102] include radioactive decay [074] of one or more isotopes. In another embodiment of the above apparatus, the said nuclear reactions [102] include antimatter annihilation reactions [098]. Specifically, one embodiment of these antimatter annihilation reactions [098] is the annihilation of antiprotons on uranium nuclei. In another embodiment of the above apparatus, the said nuclear reactions [102] include reactions [076] caused by bombarding atoms with energetic particles such as the protons in the (p,n) reactions [078] or energetic photons [008] in the (g,n) reactions [086].

In one embodiment of the above apparatus, the said one or more degraders [112] also absorb electromagnetic radiation [008] emanating from said one or more regions. Such electromagnetic radiation [008] can include photons, which those of ordinary skill in the art can be called x-rays or gamma-rays [058]. In one embodiment of the above apparatus, the said sulfur atoms [030] include the isotope sulfur-32 [032], sulfur-33 [033], sulfur-34 [034], or sulfur-36

[036]. In another embodiment of the above apparatus, the said sulfur atoms [030] consisting essentially of the isotope sulfur-32 [032], sulfur-33 [033], sulfur-34 [034], and sulfur-36 [036] atoms.

B. Deuterium-Deuterium Fusion

One teaching embodiment for teaching broader concepts is directed to the nuclear reaction [102] of deuterium-deuterium (DD) fusion, a reaction in which neutrons [004] are created at much lower kinetic energy than other types of neutronic fusion reactions, such as deuterium-tritium (DT) reactions. DD fusion is employed herein as a prophetic teaching, recognizing that materials other than deuterium can be fused consistent with the prophetic teaching by this example.

One embodiment for net electrical power generation [028] utilizing nuclear fusion [072] is to induce fusion events by colliding a beam of deuterons [062](bare deuterium nuclei) with another beam of deuterons [062]. In other words, nuclear fusion reactions [072] comprise fusion of deuterium nuclei with other deuterium nuclei. Bare nuclei are atoms that have had all of their orbiting electrons stripped away. In one embodiment, the kinetic energy of the two deuteron [062] beams are substantially equal, meaning that the difference between the average kinetic energies of the two deuteron [062] beams is comparable or smaller than the spread of kinetic energies of the individual deuterons [062] within the two said beams.

When the two beams of deuterons [062] collide with equal kinetic energy, the collisions are said to occur in the center-of-mass frame. Another term employed by those of normal skill in physics is center-of-momentum frame. The probability of deuterons [062] in opposing beams colliding with sufficient energy to induce nuclear fusion [072] is quantified by cross section. There are two fusion cross sections (or fusion channels) associated with DD fusion. In the first channel the deuterons merge to form the nuclear isotope helium-3 plus a neutron [004]. Because the combined mass of the helium-3 nucleus and neutron [004] is less than the mass of two deuterons [062], the helium-3 nucleus and neutron [004] are each created [002] with accompanying kinetic energy. This mass difference between the initial and final states, along with the principles of conservation of momentum and conservation of energy dictate that if fusion could occur with deuterons [062] at rest, the kinetic energies of the helium-3 nuclei and neutron [004] would be 0.082 MeV and 2.45 MeV respectively.

Figure 11:
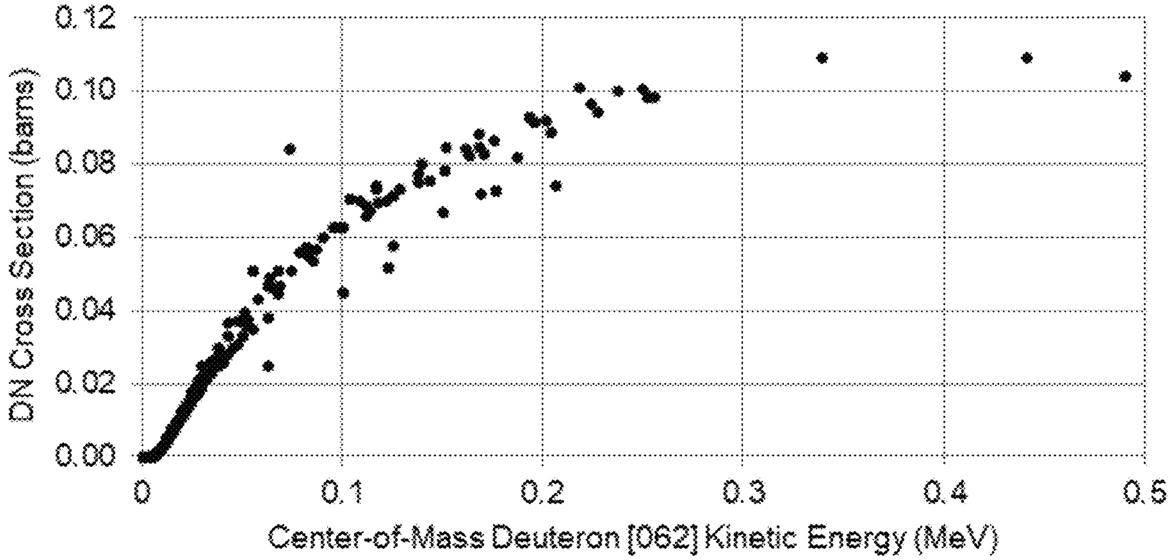
FIG. 11 is a plot of published experimental data showing the DD fusion cross section for the reaction channel yielding a neutron [004].

Because both deuterons possess positive electrical charges, they repel one another. To induce nuclear fusion [072] it is necessary to bring the two deuterons [062] close together. This proximity is achieved by accelerating the deuterons [062] to a sufficiently large kinetic energy. The fusion cross section for this neutronic channel is plotted as a function of deuteron kinetic energy in the center-of-mass frame in FIG. 11. Note that the cross section increases with kinetic energy up to a maximum of approximately 0.1 barns. A barn is a convenient unit of cross section employed by physicists, equivalent to $10^{-28}$ $m^2$.

Figure 12:
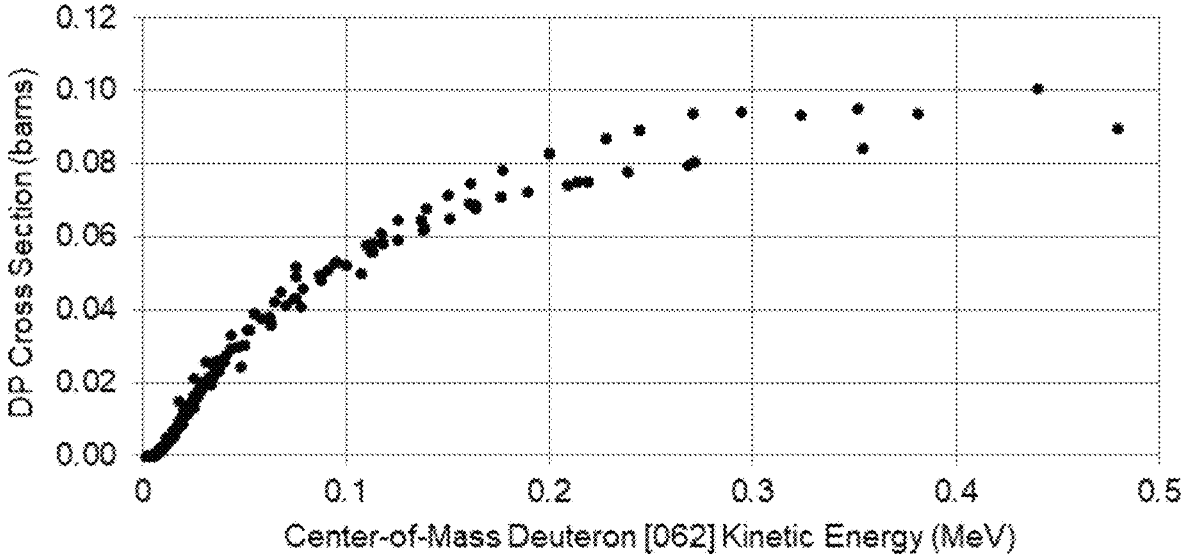
FIG. 12 is a plot of published experimental data showing the DD fusion cross section for the reaction channel yielding a proton [061].

The second DD fusion channel is aneutronic. In this second channel the deuterons merge to form the nuclear isotope hydrogen-3 (tritium) plus a proton (hydrogen-1) [061]. Because the combined mass of the hydrogen-3 nucleus and proton [061] is less than the mass of two deuterons [062], the hydrogen-3 nucleus and proton [061] are each created [002] with accompanying kinetic energy. This mass difference between the initial and final states, along with the principles of conservation of momentum and conservation of energy dictate that if fusion could occur with deuterons [062] at rest, the kinetic energies of the hydrogen-3 nucleus and proton [061] would be 1.01 MeV and 3.02 MeV respectively. The fusion cross section for this aneutronic channel is plotted as a function of deuteron kinetic energy in the center-of-mass frame in FIG. 12. Note that the cross section increases with kinetic energy up to a maximum of approximately 0.1 barns.

Therefore, in the context of DD nuclear fusion the step of creating [002] consists of (or consists essentially of) neutrons [004] and the ions hydrogen-1 [061], hydrogen-3, and helium-3. The step of stopping [012] takes place for the ions the ions hydrogen-1 [061], hydrogen-3, and helium-3. Because both DD fusion channels have approximately the same dependence of cross section on center-of-mass deuteron kinetic energy, the two channels occur with approximately equal probability. For this reason it is noted that the creating [002] of a neutron [004] occurs in approximately half of all DD fusion events.

In order to achieve breakeven energy production, DD fusion with deuteron [062] kinetic energies as high as 0.5 MeV is an embodiment. One prophetic teaching is for the center-of-mass deuteron [062] kinetic energies at the time of collision to be larger than 0.1 MeV. Other prophetic teachings are for center-of-mass deuteron [062] kinetic energies at the time of collision to be larger than 0.2 MeV, 0.3 MeV, 0.4 MeV, 0.5 MeV, 0.6 MeV, 0.7 MeV, 0.8 MeV, 0.9 MeV, and 1.0 MeV.

Figure 13:
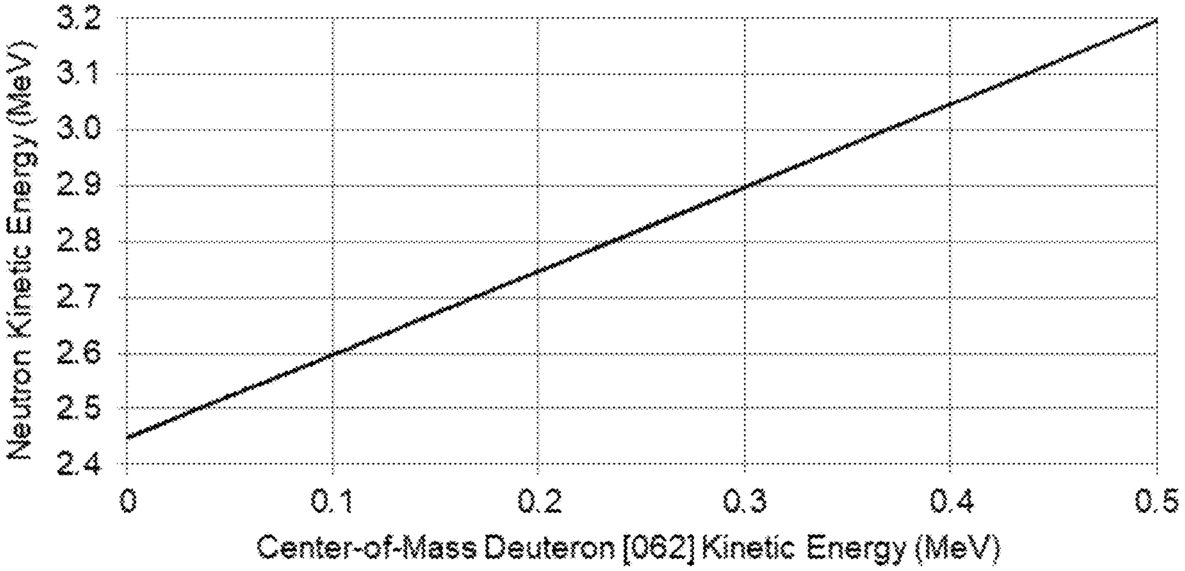
FIG. 13 is a plot of the calculated neutron [004] kinetic energy generated by a DD fusion reaction as a function of the kinetic energy of each deuteron [062] beam that are in direct head-on collision.

As the kinetic energy of the two beams of deuterons [062] is increased, the kinetic energy of the neutrons [004] also increases due to conservation of energy. FIG. 13 contains a plot of the calculated neutron [004] kinetic energy as a function of center-of-mass deuteron [062] kinetic energy. Note that as previously stated, at a deuteron [062] kinetic energy of zero (at rest) the kinetic energy of the neutron [004] is 2.45 MeV. As the deuteron [062] kinetic energy is increased the neutron [004] kinetic energy also increases. At deuteron [062] beam kinetic energies of 0.5 MeV the neutron [004] kinetic energy increases to 3.2 MeV.

C. Sulfur Blanket

Figure 14:
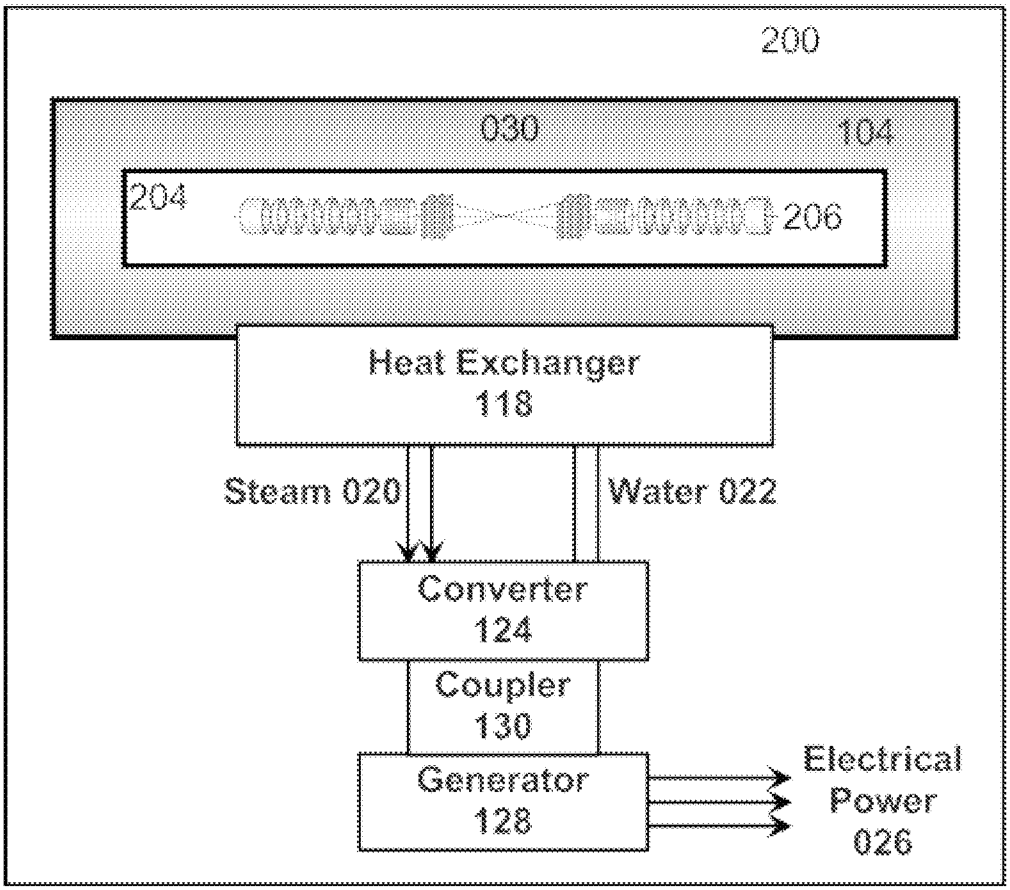
FIG. 14 is an illustration of an embodiment of a power plant [200] harvesting energy from fusion reactions [072] and nuclear reactions [102] within a surrounding sulfur blanket [104] in order to generate [028] electrical power [026].

One prophetic teaching of a power plant [200] that houses a generator [128] of electrical power [026] is illustrated in FIG. 14. Note that a basic concept for such embodiments is to suspend the ion accelerator [206] within a vacuum vessel wall [204] maintaining a vacuum sufficient to operate said ion accelerator [206]. The vacuum vessel wall [204] is enclosed, at least in part, by a volume of sulfur atoms [030]. This volume is called a sulfur blanket [104]. The vacuum vessel wall [204] can be composed of aluminum, stainless steel, or titanium.

In one embodiment, the sulfur blanket [104] is in the form of molten sulfur. The heat [116] and electromagnetic radiation [008] from the steps of creating [002], stopping [012], moderating [010], and capturing [016] is deposited into the molten sulfur. The purpose heat exchanging [018] is to remove this heat [116] from the sulfur blanket [104], boiling liquid water [022] to produce high pressure steam [020]. In one embodiment the molten sulfur [030] within the sulfur blanket [104] undergoes thermal convection, and pipes containing flowing water [022] near the top of the sulfur blanket remove heat [116] from the sulfur blanket [104] and deliver it into the water [022] to produce steam [020]. The high pressure steam [020] is then converted [024] back into water in a process employing a converter [124] and coupler

[130] that ultimately delivers the energy into a generator [128] of electrical power [026].

FIG. 15 illustrates a prophetic teaching wherein nuclear reactions [102] take place within a degrader [112]. In an embodiment the degrader [112] is, at least in part, a vacuum vessel wall [204]. The degrader performs, at least in part, the step of stopping [012] ions and converting electromagnetic radiation [008] from the nuclear reactions [102] into heat [116]. Outside of the degrader [112] is a moderator [110] that is, at least in part, composed of sulfur atoms [030]. The heat exchanger [118] is in thermal contact with the sulfur atoms [030]. In one embodiment the heat exchanger [118] is completely within sulfur blanket [104], communicating energy out of the sulfur blanket [104] via water [022] and steam [020]pipes.

In a prophetic teaching, the utility of a sulfur blanket [104] is demonstrated by considering DD fusion as the nuclear reaction [102]. DD fusion has two equal probability channels, one neutronic and the other aneutronic. The net energy gain from the neutronic reaction is 0.082 MeV plus 2.45 MeV for a total of 3.27 MeV. The net energy gain from the aneutronic reaction is 1.01 MeV plus 3.02 MeV for a total of 4.03 MeV. Therefore, the average net energy gain for DD fusion reactions is 3.65 MeV.

TABLE 1

Calculation of sulfur blanket [104] energy release per captured neutron [004].

| Absorbing Isotope | Sulfur-32 | Sulfur-33 | Sulfur-34 | Sulfur-36 |
|---|---|---|---|---|
| Natural Abundance | 94.99% | 0.75% | 4.25% | 0.01% |
| Capture Cross Section (barns) | 0.518 | 0.454 | 0.256 | 0.236 |
| Relative Capture Probability | 0.49204 | 0.00341 | 0.01088 | 0.00002 |
| Absolute Capture Probability | 97.17% | 0.67% | 2.15% | 0.00% |
| Capture Energy Gain (MeV) | 8.641 | 11.417 | 6.986 | 4.303 |
| Radioactive Isotope | | | Sulfur-35 | Sulfur-37 |
| Decay Product | | | Chlorine-35 | Chlorine-37 |
| Decay Energy Release (MeV) | | | 0.167 | 4.865 |
| Total Energy Release (MeV) | 8.641 | 11.417 | 7.153 | 9.169 |
| Weighted Release (MeV) | 8.397 | 0.077 | 0.154 | 0.000 |
| Release per Neutron (MeV) | | | | 8.628 |

Table 1 contains the input and calculated parameters that determine the energy release per captured neutron [004] in a sulfur blanket [104]. The four columns of values contain the calculations parameters associated with reactions illustrated in FIGS. 5, 6, 7, and 8. The top two parameter values are drawn from the information presented in FIG. 3. The relative capture probability is calculated by multiplying the isotope natural abundance by the (n,g) [088] capture cross section. The absolute capture probability is the relative capture probability divided by the sum of all relative capture probabilities across the four table columns. The absolute capture probability is the probability of a capture neutron being captured by that particular isotope assuming natural sulfur atoms [030] abundances. The capture energy gain is simply the mass difference between the final and initial states of each reaction.

Figure 8:
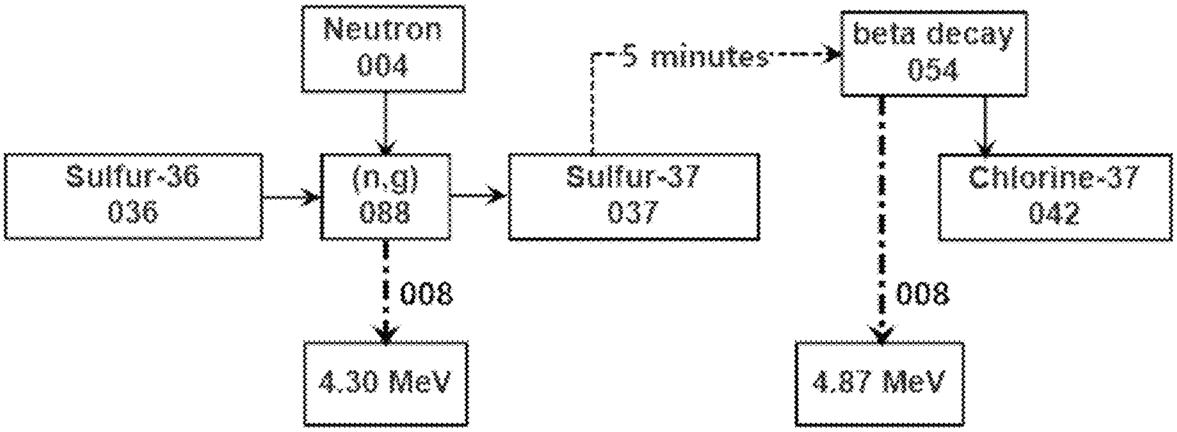
FIG. 8 is an illustration of the isotope sulfur-36 [036] capturing [016] a neutron [004] to form sulfur-37 [037] and emit 4.30 MeV of electromagnetic radiation [008]. Sulfur-37 [037] then undergoes beta decay with a half-life of 5 minutes to form chlorine-37 [042] with the additional release of 4.87 MeV of electromagnetic radiation [008].

As indicated in FIGS. 7 and 8, the beta decay of radioactive isotopes sulfur-35 [035] and sulfur-37 [037] into the stable isotopes chlorine-35 [040] and chlorine-37 [042] respectively also contribute to the amount of electromagnetic radiation [008] and hence heat [116] produced within the sulfur blanket [104]. The two right columns contain parameter values calculated for those radioisotope decay [074] reactions.

In an embodiment wherein the two beams of deuterons [062] collide with equal energies of 0.5 MeV, the data in FIG. 13 indicates that neutrons [004] enter the sulfur blanket [104] with kinetic energies as high as 3.2 MeV. According to the data presented in FIGS. 9 and 10, the cross section for such neutrons [004] captured on sulfur-32 atoms [032] due to the nucleon exchange reactions [076](n,a) [090] and (n,p) [092] can be as high as 0.16 barns, triple the (n,g) [088] radiative capture cross section of 0.518 barns. Table 2 contains the input and calculated parameters that determine the energy release per captured neutron [004] due to these two nucleon exchange reactions [076].

TABLE 2

Calculation of sulfur blanket [104] energy release per captured neutron [004] due to nucleon exchange reactions [076] with sulfur-32 [032] atoms.

| Decay Product Isotope | Silicon-29 | Phosphorus-32 |
|---|---|---|
| Nucleon Exchange Reaction | (n, a) | (n, p) |
| Capture Energy Release (MeV) | 2.548 | 0.093 |

TABLE 2-continued

Calculation of sulfur blanket [104] energy release per captured neutron [004] due to nucleon exchange reactions [076] with sulfur-32 [032] atoms.

| Decay Product Isotope | Silicon-29 | Phosphorus-32 |
|---|---|---|
| Radioactive Decay Channel | Stable | Beta Decay |
| Decay Half Life (days) | | 14.3 |
| Radioactive Decay Product | | Sulfur-32 |
| Decay Energy Release (MeV) | | 1.711 |
| Total Energy Release (MeV) | 2.548 | 1.804 |
| Release per Neutron (MeV) | | 4.352 |

Note that the energy gain from the nucleon exchange reactions [076] in Table 2 produce about half of the radiative capture (n,g) [088] reaction for sulfur-32 [032] listed in Table 1 and FIG. 5. Because the neutrons [004] moderate [010] very quickly while traveling through sulfur atoms [030], the overall probability of these nucleon exchange reactions [076] is relatively low.

D. Electrical Power Generation

Figure 17:
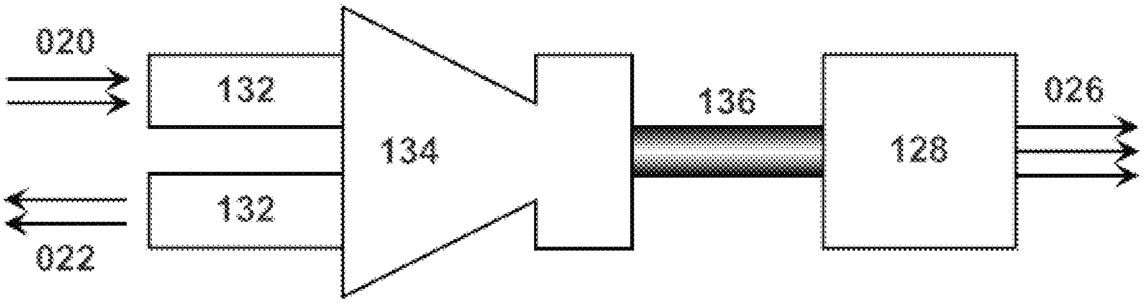
FIG. 17 is an illustration of a turbine [134] powered by the thermal energy in steam [020] employed to turn a drive shaft [136] which turns a generator [128] that produces electrical power [026].

The step of electricity generating [028] in FIG. 1 is taught in FIGS. 14, 15, and 16 as the combination of a converter [124], a coupler [130], and a generator [128]. In one embodiment illustrated in FIG. 17, the converter [124] is a turbine [134] that converts thermal energy in the steam into rotational motion of a drive shaft [136] which acts as a coupler [130]. The drive shaft [136] turns a generator [128] to produce electrical power [026]. There are many other types of converters [124], couplers [130], and electrical generators. In one alternative embodiment, the converter [124] is a thermoelectric element utilizing the Peltier-Seebeck effect to convert heat [116] into DC electrical power, the coupler [130] are wires carrying this electrical power, and the generator [128] is a DC to AC transformer circuit.

Figure 18:
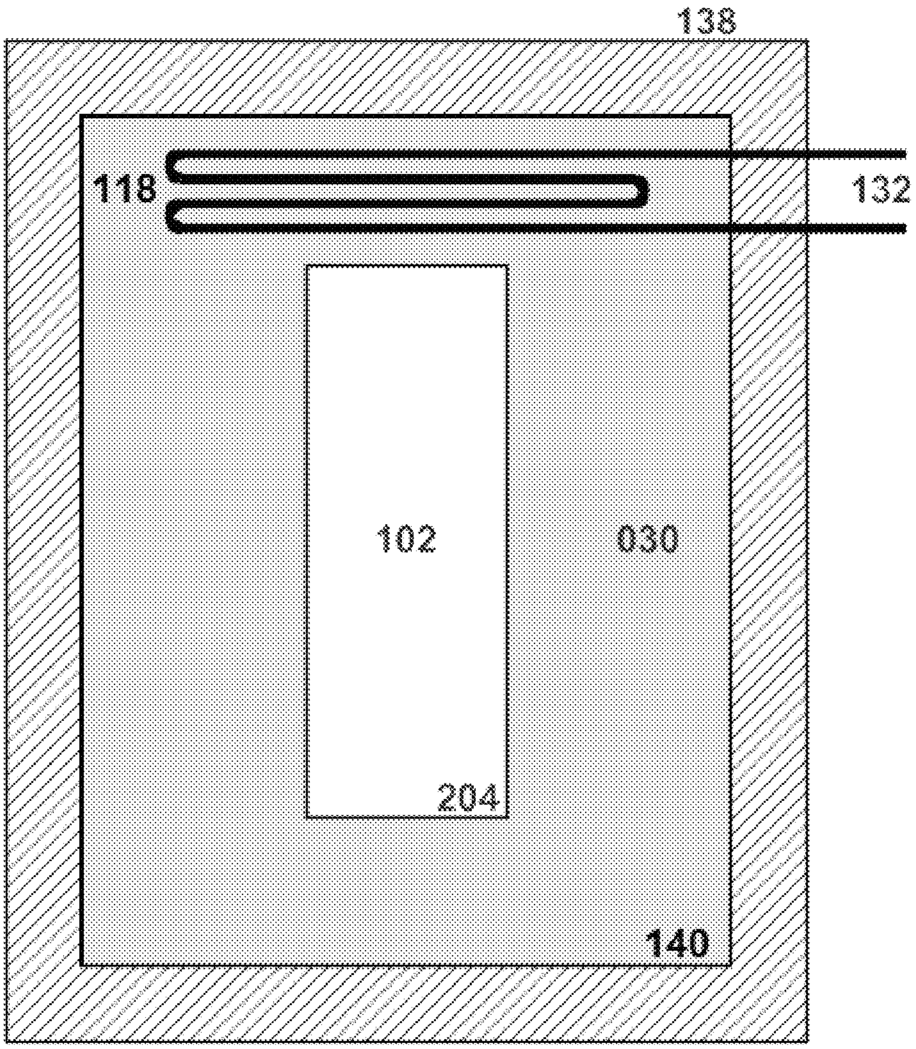
FIG. 18 is an illustration of a sulfur containment vessel [140] and a heat exchanger [118] that are heater by nuclear reactions [102].

In order to generate power, it is necessary to first remove the heat from the sulfur atoms [030]. FIG. 18 is an illustration of a sulfur containment vessel [140] surrounded by thermal insulation [138] in order to assure that substantially all of the heat [116] absorbed within the vessel is removed by a heat exchanger [118] that carries water [022] and steam [020] in pipes [132] to the converter [124]. The nuclear reactions [102] occur within a vacuum vessel wall [204] that is immersed within the sulfur atoms [030] within the sulfur containment vessel [140].

In one embodiment the heat exchanger [118] resides near the top of the sulfur containment vessel [140] where convection currents within the molten sulfur maintain maximum sulfur temperatures in the area around the heat exchanger [118]. I another embodiment the sulfur containment vessel [140] exterior walls (walls in thermal communication with the thermal insulation [138]) are thick enough to absorb electromagnetic radiation [008] that might otherwise escape from the sulfur atoms [030].

E. Sulfur-Sodium Battery

There is enough sunlight and wind power on the planet to supply all of the energy needs of the world. The problem is that the availability of harvested power does not necessarily coincide with the instantaneous energy demands of consumers. An inexpensive and compact means of storing electrical power is one of the greatest challenges facing humanity.

Commercial nuclear fission reactors are capable of generating a steady electrical power level, but are not capable of tracking the minute-by-minute demand changes exhibited on electrical grids. A means of steadily charging and then quickly discharging stored energy as demand requires would also provide significant advantages.

DD nuclear fusion [072] coupled to a sulfur blanket [104] can provide steady electrical power [026] similar to that of a commercial nuclear fission reactor. The apparatus in FIG. 14 can be configured to follow hourly demand fluctuations, but cannot source high instantaneous peak electrical powers [026] for such surge loads as starting a large electric motor.

Figure 19:
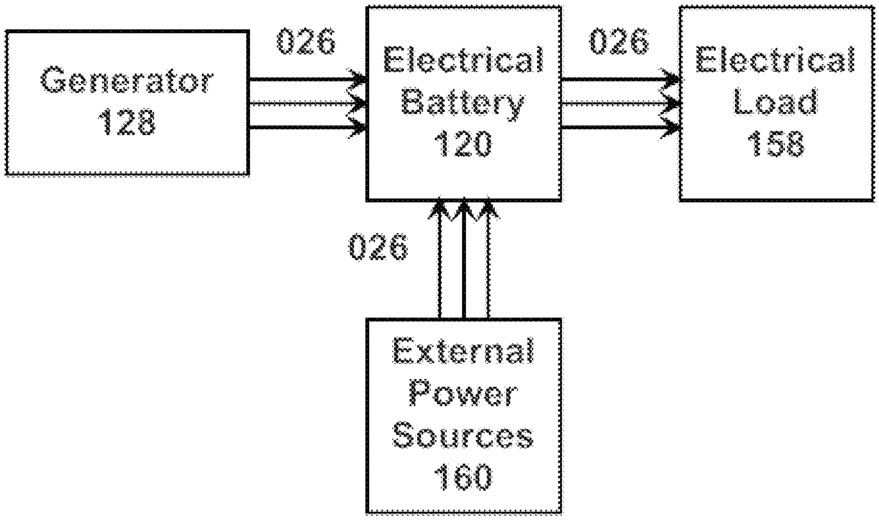
FIG. 19 is an illustration of the addition of an electrical battery [120] between the generator [128] and an electrical load [158] wherein the electrical battery [120] is also fed electrical power [026] by external power sources [160].

As illustrated in FIG. 19, one embodiment is to place an electrical battery [120] between the generator [128] and an electrical load [158] in order to provide such surge capacity. Another aspect of this embodiment is to store electrical power [026] from external power sources [160] such as wind turbines and solar arrays.

Figure 20:
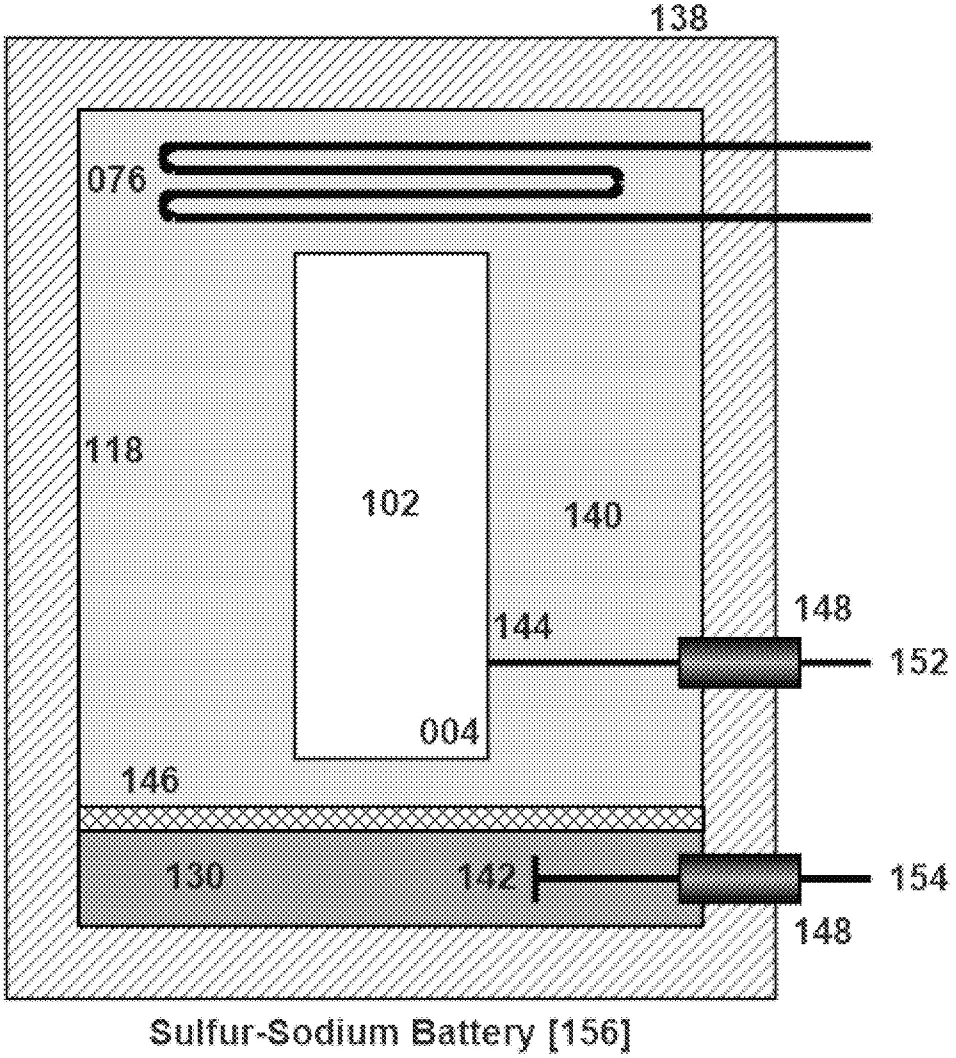
FIG. 20 is an illustration of an embodiment wherein a sulfur containment vessel [140] is utilized simultaneously as a sulfur blanket [104] and a sulfur-sodium battery [156].

One type of electrical battery [120] under study for many decades is the sulfur-sodium battery [156]. In an embodiment, the power plant [200] of FIG. 14, wherein the sulfur blanket [104] is constructed in a manner similar to the embodiment illustrated in FIG. 18, is modified to simultaneously produce a sulfur-sodium battery [156]. An embodiment wherein a sulfur blanket [104] also functions as a sulfur-sodium battery [156] is illustrated in FIG. 20.

A reservoir of molten sodium atoms [038] is separated from a molten sulfur-sodium mixture [150] by a solid electrolyte [146]. In an embodiment this solid electrolyte [146] is composed of the ceramic b"-alumina (BASE). The molten sodium atoms [038] serves as the anode [142] and the molten sulfur-sodium mixture [150] serves as the cathode [144]. The negative terminal [154] of this sulfur-sodium battery [156] is in electrical contact with the molten sodium [038] while the positive terminal [152] of the battery [156] is in electrical communication with the molten sulfur-sodium mixture [150]. In this scenario the sulfur containment vessel [140] walls are not in electrical communication with either the molten sodium [038] or sulfur-sodium mixture [150] or both. The negative terminal [154] and positive terminal [152] pass through the sulfur containment vessel [140] wall utilizing electrical insulators [148]. There can be more than one reservoir of sodium atoms [038], solid electrolyte [148], negative terminal [154], and/or positive terminal [152].

This embodiment can, in some cases, be advantageous over past embodiments of a sulfur-sodium battery [156] because of the elevated temperature required to operate such a battery [156] and the additional cost and complexity of providing the required heat [116] and thermal insulation [138] as compared to other battery [120] technologies. Because of the existence of the sulfur blanket [104] as a means of increasing the electrical power [026] output of a nuclear fusion [072] power plant [200], all of these additional costs and complexities already existed.

Figure 21:
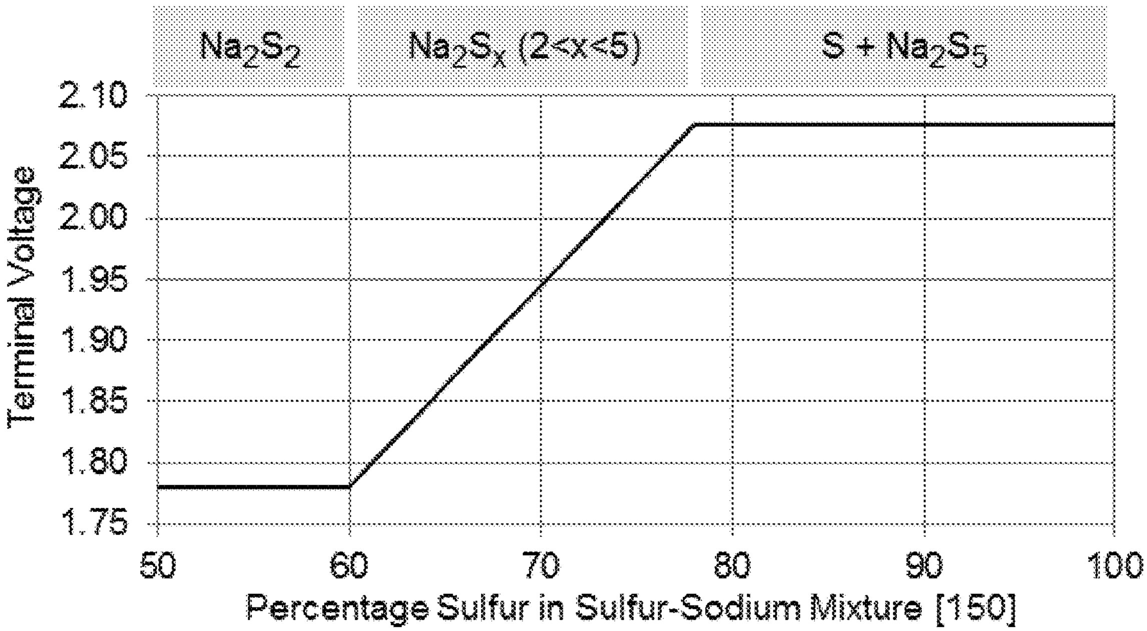
FIG. 21 is a plot of the sulfur-sodium battery [156] voltage as a function of sulfur [030] concentration in the sulfur-sodium mixture [150].

When the sulfur-sodium battery [156] is fully charged, substantially all of the sodium atoms [038] are in the sodium reservoir. As plotted in FIG. 21, at this time the voltage across the positive terminal [152] and negative terminal [154] is 2.076 Volts at a battery temperature of 350° C. As the sulfur-sodium battery [156] discharges electrical current across the terminals [152,154] sodium ions pass through the solid electrolyte [146] and preferentially form the compound $Na_2S_5$. Starting near the solid electrolyte [146] this compound gradually forms in progressively large volume into the sulfur-sodium mixture [150] volume. When the percentage of sulfur atoms [030] in the sulfur-sodium mixture [150] reaches approximately 78%, the sulfur-sodium battery [156] voltage begins to decrease as first $Na_2S_4$, then $Na_2S_3$, and then $Na_2S_2$ begin to form. At a concentration of 60% sulfur atoms [030] in the sulfur-sodium mixture [150] substantially all of the sulfur-sodium mixture [150] is composed of $Na_2S_2$ and the sulfur-sodium battery [156] voltage becomes a constant 1.78 Volts.

The theoretical capacity of a sulfur-sodium battery [156] is 760 Watt-hours per kilogram, but past practical performance has been limited to 110-150 Watt-hours/kg. In an exemplary teaching example, a sulfur blanket that is 2 m in radius and 4 m long would have a mass of approximately 90,000 kg. Such a sulfur-sodium battery [156] has an expected demonstrated electrical energy storage capacity of 12,000 kW-hrs. This is enough stored electrical power [026] to supply electricity to 500 average homes for a day.

In the sulfur blanket [104] energetic neutrons [004] are moderated as they travel through the volume of the sulfur blanket [104]. In an embodiment wherein the sulfur blanket [104] also functions as a sulfur-sodium battery [156], some of the sodium atoms [038] are positioned to also moderate [010] and capture [016] neutrons [004]. In other words, the volume of sulfur atoms [030] comprises sodium atoms

Figure 22:
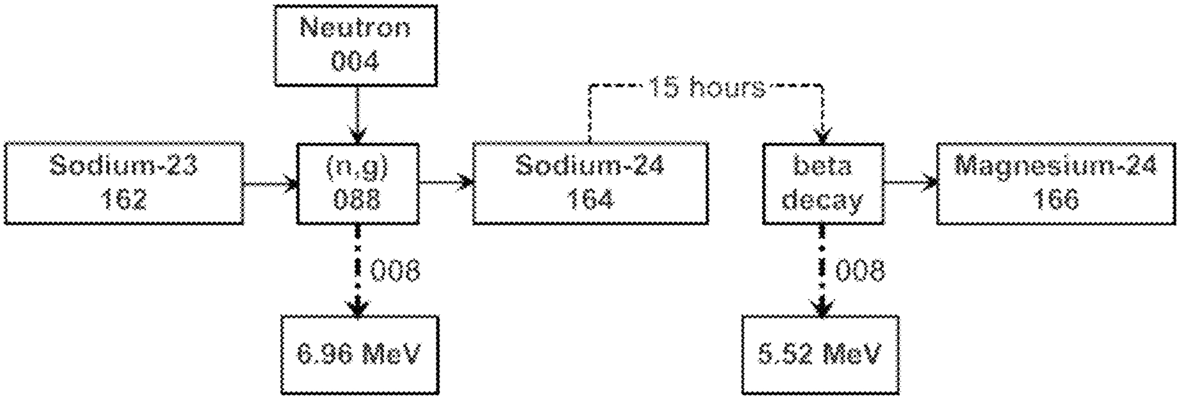
FIG. 22 is an illustration of the isotope sodium-23 [162] capturing [016] a neutron [004] to form sodium-24 [164] and emit 6.96 MeV of electromagnetic radiation [008]. Sodium-24 [164] then undergoes beta decay with a half-life of 15 hours to form magnesium-24 [166] with the additional release of 5.52 MeV of electromagnetic radiation [008].

[038]. Because naturally occurring sodium [038] is composed of only sodium-23 [162] which has a mass lower than the dominant naturally occurring sulfur isotope sulfur-32 [032], the sodium atoms [038] improve the moderating [010] function of the sulfur blanket [104]. FIG. 22 is an illustration of the neutron [004] capture [016] and subsequent heat [116] released by sodium-23 [162]. When sodium-23 [162] captures [016] a neutron [004] it becomes the radioactive isotope sodium-24 [164], which undergoes beta-decay with a half-life of 15 hours to become magnesium-24. The total sodium [038] energy release of 12.47 MeV per captured neutron is significantly higher than the 8.68 MeV per neutron released on average by sulfur atoms [030]. The sodium atoms [038] improve the capturing [016] function of the sulfur blanket [104].

F. High Neutron Cross Section Additives

There are embodiments wherein other elements are added to the sulfur atoms [030] in the sulfur blanket [104] to improve the performance, size, capital cost, and weight of a power plant [200]. There are dozens of such elements that can be utilized such a way, several that are discussed below exemplifying embodiments that serve specific applications or commercial markets.

As summarized in FIG. 3, the peak thermal neutron capture cross section for sulfur [030] is 0.518 barns. There are embodiments wherein a much higher capture cross section is desired in order to reduce the radius (and hence weight, volume, and cost) of a power plant [200]. Otherwise, too many neutrons [004] pass through the sulfur containment vessel [140] walls, giving up their initial kinetic energy but not inducing the energy release that comes with capture [016].

In one embodiment, mercury-199 atoms added to the sulfur blanket [104] in the form of mercury sulfide, otherwise known as cinnabar or vermilion when accompanied by the other mercury isotopes found in naturally occurring mercury. Mercury-199 atoms have a thermal neutron capture cross section of 2150 barns, approximately 4000 greater than that of sulfur [030]. For unenriched mercury, doubling the effective capture cross section of the sulfur blanket [104] requires the addition of approximately 0.3% mercury atoms by moles. Because the natural abundance of mercury-199 atoms is 16.87%, 0.3% addition of unenriched mercury atoms would increase neutron capture performance by an order of magnitude. The disadvantage of the use of mercury-199 is the reduction in the amount of energy liberated by neutron capture [016]. Instead of producing 8.63 MeV per neutron with sulfur [030], mercury-199 produces 7.95 MeV. An attractive feature of capturing [016] neutrons [004] with mercury-199 is that mercury-199 typically emits much lower energy gamma-rays [058] which are absorbed by the sulfur blanket [104] in a much shorter distance. This also reduces the size of the sulfur blanket [104]. The mercury atoms are positioned to also moderate [010] neutrons [004].

Other embodiments that employ the addition (either in enriched or unenriched form) of alternative isotopes in the sulfur blanket [104] exist. These embodiments include the use of the isotopes beryllium-7, lithium-6, boron-10, sodium-22, chlorine-35 [040], bromine-79, tantalum-179, iodine-125, and isotopes of xenon, cadmium, hafnium, gadolinium, cobalt, samarium, titanium, dysprosium, erbium, europium, molybdenum and ytterbium.

There are specific applications wherein much higher sulfur blanket [104] energy gains are useful, despite severe difficulties in the areas of safety, radioactive waste, national security, and other non-technical considerations. In such applications an embodiment is the addition of uranium-235 to the sulfur blanket [104]. The uranium in spent commercial fuel rods are composed primarily of uranium-238 (depleted uranium) and uranium-235 (fissile uranium). The fissile uranium in these fuel rods are typically enriched to approximately 3% abundance, and the spent fuel rods have lost typically 6% of that fissile uranium population before they are removed and stored. There is currently a significant issue around the world with the indefinite storage of such spent fuel rods. When such spent fuel rods are utilized in a sulfur blanket [104], the level of fissile uranium depletion is not significant until over 90% of the fissile uranium is consumed. Therefore, such an embodiment provides an alternative destination for such spent fuel rods, and further, the storage of such fuel rods can be alleviated.

There are alternative embodiments in which the addition of enriched uranium-235 up to 80% is desired. In one such embodiment the enriched fissile uranium is added in the form of uranium sulfide.

The dominant thermal neutron capture reaction for uranium-235 induces nuclear fission [070] and has a cross section of 583 barns. This is 1000 time greater than the capture cross section of sulfur [030]. Adding uranium-235 to a sulfur blanket [104] dramatically increases energy release. When uranium-235 undergoes fission it releases roughly 1 MeV per amu, or 235 MeV. Most of this energy is in the form of fission daughter kinetic energy, which is stopped [012] by the sulfur [030] and other surrounding material in a distance short compared to the dimensions of the sulfur blanket [104]. This represents an energy release approximately 33 times larger than that of sulfur [030] upon the capture [016] of a neutron [004]. The other aspect of such embodiments is a greater breakeven margin for such a power plant [200].

G. Statement of Scope

In sum, it is important to recognize that this disclosure has been written as a thorough teaching rather than as a narrow dictate or disclaimer. Reference throughout this specification to "one embodiment", "an embodiment", or "a specific embodiment" means that a particular feature, structure, or characteristic described in connection with the embodiment is included in at least one embodiment and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other embodiments. It is to be understood that other variations and modifications of the embodiments described and illustrated herein are possible in light of the teachings herein and are to be considered as part of the spirit and scope of the present subject matter.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Variation from amounts specified in this teaching can be "about" or "substantially," so as to accommodate tolerance for such as acceptable manufacturing tolerances.

The foregoing description of illustrated embodiments, including what is described in the Abstract and the Modes, and all disclosure and the implicated industrial applicability, are not intended to be exhaustive or to limit the subject matter to the precise forms disclosed herein. While specific embodiments of, and examples for, the subject matter are described herein for teaching-by-illustration purposes only, various equivalent modifications are possible within the spirit and scope of the present subject matter, as those skilled in the relevant art will recognize and appreciate. As indicated, these modifications may be made in light of the foregoing description of illustrated embodiments and are to be included, again, within the true spirit and scope of the subject matter disclosed herein.

The invention claimed is:

1. A method of producing electrical power, the method comprising:

- creating neutrons via nuclear reactions, said neutrons carrying neutron kinetic energy;
- moderating said neutrons by reducing their kinetic energy to produce moderated neutrons, converting the neutron kinetic energy into heat, and transmitting said heat to a heat exchanger;
- creating ions via the nuclear reactions, stopping the ions to produce additional heat, and transmitting to said heat exchanger the additional heat generated by the stopping of the ions;
- capturing said moderated neutrons with sulfur atoms in molten sulfur to produce other heat, and
- transmitting to said heat exchanger said other heat released by the capturing of said moderated neutrons;
- transmitting decay heat from radioisotopes created by the capturing of said moderated neutrons to said heat exchanger;
- heat exchanging at least some of each of said heat, said additional heat, said other heat, and said decay heat by converting water into steam; and
- generating electrical power with said steam.

2. The method of claim 1, wherein said nuclear reactions include at least one of fission reactions, fusion reactions, radioactive decay of one or more isotopes, antimatter annihilation reactions, reactions caused by bombarding atoms with energetic particles, nuclear exchange reactions, and reactions caused by energetic photons.

3. The method of claim 1, wherein said nuclear reactions comprise fusion reactions of deuterium nuclei with other deuterium nuclei.

4. The method of claim 1, wherein said moderating is performed by said sulfur atoms.

5. The method of claim 1, wherein said capturing is performed with sulfur atoms consisting essentially of isotopes sulfur-32, sulfur-33, sulfur-34, and sulfur-36 atoms.

6. The method of claim 1, wherein said moderating is also performed with sodium atoms.

7. The method of claim 1, wherein said capturing is also performed with mercury atoms.

8. The method of claim 1, wherein said capturing is performed with sulfur atoms comprising isotope sulfur-32 atoms.

9. The method of claim 1, wherein said capturing creates radioactive isotopes comprising sulfur-35 and sulfur-37, and transmitting decay heat from decaying radioisotopes comprises transmitting heat generated by beta decay of said sulfur-35 and sulfur-37.

10. The method of claim 1, wherein isotope sulfur-32 comprises 94.99% of said sulfur atoms.

* * * * *